United States Patent
Bennett et al.

(10) Patent No.: US 7,908,145 B2
(45) Date of Patent: *Mar. 15, 2011

(54) DOWN-LINE TRANSCRIPTION SYSTEM USING AUTOMATIC TRACKING AND REVENUE COLLECTION

(75) Inventors: James D. Bennett, Austin, TX (US); Lawrence M. Jarvis, Wheaton, IL (US)

(73) Assignee: Engate LLC, New Castle, DE (US)

(*) Notice: Subject to any disclaimer, the term of this patent is extended or adjusted under 35 U.S.C. 154(b) by 156 days.

This patent is subject to a terminal disclaimer.

(21) Appl. No.: 11/559,297

(22) Filed: Nov. 13, 2006

(65) Prior Publication Data

US 2007/0239446 A1 Oct. 11, 2007

Related U.S. Application Data

(60) Continuation of application No. 09/422,202, filed on Oct. 19, 1999, which is a continuation-in-part of application No. 09/057,650, filed on Apr. 9, 1998, now Pat. No. 5,970,141, which is a continuation of application No. 08/339,771, filed on Nov. 15, 1994, now Pat. No. 5,740,245, which is a continuation of application No. 08/036,488, filed on Mar. 24, 1993, now Pat. No. 5,369,704, said application No. 09/422,202 is a continuation-in-part of application No. 09/185,114, filed on Nov. 3, 1998, now Pat. No. 6,023,675, which is a division of application No. 08/818,402, filed on Mar. 12, 1997, now Pat. No. 5,949,952, which is a continuation of application No. 08/066,948, filed on May 24, 1993, now Pat. No. 5,878,186, which is a continuation-in-part of application No. 08/036,488, filed on Mar. 24, 1993, now Pat. No. 5,369,704.

(60) Provisional application No. 60/140,760, filed on Jun. 24, 1999.

(51) Int. Cl.
*G10L 11/00* (2006.01)
*G10L 21/00* (2006.01)

(52) U.S. Cl. ............. 704/270.1; 704/270; 704/275
(58) Field of Classification Search ......... 704/270–275
See application file for complete search history.

(56) References Cited

U.S. PATENT DOCUMENTS 3,557,927 A 1/1971 Wright et al.
(Continued)

FOREIGN PATENT DOCUMENTS

JP 402007159 1/1990
(Continued)

OTHER PUBLICATIONS

*Case CATalyst User's Guide*, Stenograph LLC,(2000),p. 1-7, 119-120, 209-323, 283-284 (35 pgs.).

(Continued)

*Primary Examiner* — Eric Yen
(74) *Attorney, Agent, or Firm* — Pillsbury Winthrop Shaw Pittman LLP

(57) ABSTRACT

A transcription network having linked computer terminals for a court reporter and for examining, defending, and associate attorneys is disclosed. Real-time transcription text is communicated from the reporter's terminal through the network. Secure message interchange between the examining attorneys and between defending attorneys is provided along independent communication links and using encryption. Off-site terminals for clients, experts, or other associate attorneys may be linked to the network. Communication on the network is hierarchically controlled so as not to bombard the examining attorney, and is managed by a protocol for updating disconnected and non-listening terminals. The terminals provide software routines for automatically delivering proposed objections to the form of a question or answer. Stenographic keystrokes that cannot be directly transcribed are converted to a phoneme form for down-line readability. A synchronization scheme provides for automatic play-back of audio and video recordings corresponding to the transcribed text of a specific question or answer.

24 Claims, 18 Drawing Sheets

U.S. PATENT DOCUMENTS

| | | | |
|---|---|---|---|
| 3,597,538 | A | 8/1971 | Binenbaum |
| 3,798,387 | A | 3/1974 | Gallagher, Jr. |
| 3,879,751 | A | 4/1975 | Gimelli |
| 3,892,915 | A | 7/1975 | Budworth et al. |
| 4,041,467 | A | 8/1977 | Cota et al. |
| 4,205,351 | A | 5/1980 | Michals |
| 4,249,041 | A | 2/1981 | Smith et al. |
| 4,435,617 | A | 3/1984 | Griggs |
| 4,566,065 | A | 1/1986 | Toth |
| 4,633,430 | A | 12/1986 | Cooper |
| 4,641,203 | A | 2/1987 | Miller |
| 4,692,042 | A | 9/1987 | Cuff et al. |
| 4,724,285 | A | 2/1988 | Lefler et al. |
| 4,765,764 | A | 8/1988 | Lefler |
| 4,817,127 | A | 3/1989 | Chamberlin et al. |
| 4,858,170 | A | 8/1989 | DeWick et al. |
| 4,864,501 | A | 9/1989 | Kucera et al. |
| 4,866,778 | A | 9/1989 | Baker et al. |
| 4,908,866 | A | 3/1990 | Goldwasser et al. |
| 4,908,873 | A * | 3/1990 | Philibert et al. ............. 382/100 |
| 4,924,387 | A | 5/1990 | Jeppesen |
| RE33,337 | E | 9/1990 | Lefler et al. |
| 4,965,763 | A | 10/1990 | Zamora |
| 4,965,819 | A | 10/1990 | Kannes |
| 4,972,349 | A | 11/1990 | Kleinberger |
| 5,031,113 | A | 7/1991 | Hollerbauer |
| 5,043,891 | A | 8/1991 | Goldstein et al. |
| 5,051,924 | A | 9/1991 | Bergeron et al. |
| 5,101,402 | A | 3/1992 | Chiu et al. |
| 5,127,003 | A | 6/1992 | Doll, Jr. et al. |
| 5,146,439 | A | 9/1992 | Jachmann et al. |
| 5,148,366 | A | 9/1992 | Buchanan et al. |
| 5,164,985 | A | 11/1992 | Nysen et al. |
| 5,172,281 | A * | 12/1992 | Ardis et al. ................. 360/72.2 |
| 5,239,462 | A | 8/1993 | Jones et al. |
| 5,247,575 | A | 9/1993 | Sprague et al. |
| 5,265,065 | A | 11/1993 | Turtle |
| 5,267,155 | A | 11/1993 | Buchanan et al. |
| 5,272,571 | A | 12/1993 | Henderson et al. |
| 5,278,980 | A | 1/1994 | Pedersen et al. |
| 5,280,430 | A | 1/1994 | Woods et al. |
| 5,293,616 | A | 3/1994 | Flint |
| 5,303,361 | A | 4/1994 | Colwell et al. |
| 5,309,359 | A | 5/1994 | Katz et al. |
| 5,329,608 | A | 7/1994 | Bocchieri et al. |
| 5,329,609 | A | 7/1994 | Sanada et al. |
| 5,369,704 | A * | 11/1994 | Bennett et al. ................ 715/205 |
| 5,369,763 | A | 11/1994 | Biles |
| 5,375,235 | A | 12/1994 | Berry et al. |
| 5,392,428 | A | 2/1995 | Robins |
| 5,414,754 | A | 5/1995 | Pugh et al. |
| 5,444,615 | A | 8/1995 | Bennett et al. |
| 5,463,547 | A | 10/1995 | Markowitz et al. |
| 5,519,808 | A | 5/1996 | Benton, Jr. et al. |
| 5,557,722 | A | 9/1996 | DeRose et al. |
| 5,559,946 | A * | 9/1996 | Porter ........................... 715/781 |
| 5,598,557 | A | 1/1997 | Doner et al. |
| 5,613,032 | A | 3/1997 | Cruz et al. |
| 5,615,309 | A * | 3/1997 | Bezek et al. ..................... 706/50 |
| 5,732,400 | A | 3/1998 | Mandler et al. |
| 5,740,245 | A | 4/1998 | Bennett et al. |
| 5,815,392 | A | 9/1998 | Bennett et al. |
| 5,815,639 | A | 9/1998 | Bennett et al. |
| 5,855,000 | A | 12/1998 | Waibel et al. |
| 5,878,186 | A | 3/1999 | Bennett et al. |
| 5,884,256 | A | 3/1999 | Bennett et al. |
| 5,903,721 | A | 5/1999 | Sixtus |
| 5,926,787 | A | 7/1999 | Bennett et al. |
| 5,940,800 | A | 8/1999 | Bennett et al. |
| 5,949,952 | A | 9/1999 | Bennett et al. |
| 5,950,194 | A | 9/1999 | Bennett et al. |
| 5,970,141 | A | 10/1999 | Bennett et al. |
| 5,986,655 | A | 11/1999 | Chiu et al. |
| 6,014,645 | A | 1/2000 | Cunningham |
| 6,023,675 | A | 2/2000 | Bennett et al. |
| 6,026,395 | A | 2/2000 | Bennett et al. |
| 6,029,149 | A | 2/2000 | Dykstra et al. |
| 6,055,531 | A | 4/2000 | Bennett et al. |
| 6,088,686 | A | 7/2000 | Walker et al. |
| 6,091,835 | A | 7/2000 | Smithies et al. |
| 6,151,620 | A * | 11/2000 | Madsen et al. ................ 709/204 |
| 6,167,385 | A | 12/2000 | Hartley-Urquhart |
| 6,175,822 | B1 | 1/2001 | Jones |
| 6,208,979 | B1 | 3/2001 | Sinclair |
| 6,282,510 | B1 | 8/2001 | Bennett et al. |
| 6,311,169 | B2 | 10/2001 | Duhon |
| 6,393,436 | B1 | 5/2002 | Vaimberg-Araujo |
| 6,405,181 | B2 | 6/2002 | Lent et al. |
| 6,434,607 | B1 | 8/2002 | Haverstock et al. |
| 6,453,306 | B1 | 9/2002 | Quelene |
| 6,466,981 | B1 | 10/2002 | Levy |
| 6,477,575 | B1 | 11/2002 | Koeppel et al. |
| 6,484,149 | B1 | 11/2002 | Jammes et al. |
| 6,507,823 | B1 | 1/2003 | Nel |
| 6,567,791 | B2 | 5/2003 | Lent et al. |
| 6,587,841 | B1 | 7/2003 | DeFrancesco et al. |
| 6,658,393 | B1 | 12/2003 | Basch et al. |
| 6,675,142 | B2 | 1/2004 | Ortega et al. |
| 6,766,302 | B2 | 7/2004 | Bach |
| 6,795,812 | B1 | 9/2004 | Lent et al. |
| 6,847,942 | B1 | 1/2005 | Land et al. |
| 6,868,395 | B1 | 3/2005 | Szlam et al. |
| 6,898,570 | B1 | 5/2005 | Tedesco et al. |
| 6,928,412 | B2 | 8/2005 | DeBiasse |
| 6,957,192 | B1 | 10/2005 | Peth |
| 6,988,085 | B2 | 1/2006 | Hedy |
| 7,047,219 | B1 | 5/2006 | Martin et al. |
| 7,082,412 | B1 | 7/2006 | Treider et al. |
| 7,103,568 | B1 | 9/2006 | Fusz et al. |
| 7,127,395 | B1 | 10/2006 | Gorin et al. |
| 7,249,026 | B1 | 7/2007 | Bennett et al. |
| 2001/0037288 | A1 | 11/2001 | Bennett et al. |
| 2001/0039516 | A1 | 11/2001 | Bennett et al. |
| 2002/0049588 | A1 | 4/2002 | Bennett et al. |
| 2007/0250315 | A1 | 10/2007 | Bennett et al. |
| 2007/0260457 | A1 | 11/2007 | Bennett et al. |
| 2007/0260472 | A1 | 11/2007 | Bennett et al. |
| 2007/0265845 | A1 | 11/2007 | Bennett et al. |
| 2007/0265846 | A1 | 11/2007 | Bennett et al. |
| 2007/0265871 | A1 | 11/2007 | Bennett et al. |
| 2007/0266018 | A1 | 11/2007 | Bennett et al. |
| 2007/0286573 | A1 | 12/2007 | Bennett et al. |
| 2008/0015885 | A1 | 1/2008 | Bennett et al. |

FOREIGN PATENT DOCUMENTS

| | | |
|---|---|---|
| WO | WO-9422246 A2 | 9/1994 |

OTHER PUBLICATIONS

*CaseView: Reference Manual*, Stenograph Corporation,(1992),p. i, 1-28 (33 pgs).

*OmniCat II: User's Manual*, Stenograph Corporation,(1991),p. L7-6, L8-8.

*Computers for Judges: An Evaluation of Real-Time Computer Aided Transcription*, Society for Computers & Law, (Oct. 1992),p. 4-5.

*Real-Time Discovery zx Version 3.1: User Guide*, Stenograph Legal Services, Inc., San Leandro, CA,(Oct. 2, 1991),p. 1-34.

*Discovery: User Manual*, Xscribe Corporation, following pages: Intro: 1-18; Maintenance: 1-12; View/Edit: 1-20; Reports: 9-11; Exercises: 1-8; Invoking: 1-6, Installation: 1-8, Conversation: 1-6; DOS Commands: 1-8; Glossary: 1-8; Index: 1-7,(1989).

*Summation II: Reference Manual, Version 2.0*, Summation Legal Technologies, Inc.,(Feb. 1990),p. i-v; p. 6-1-6-22; p. 7-1-7-9; p. 8-1-8-20; p. 9-1-9-19.

*Flexcap User's Manual*, Manual #905-0397-000 Rev. C, Software Version 3.0, Xscribe Corporation,(1990),p. B-2-B-4.

*Word for Word—The Newsletter for Stenograph Customers*, vol. 1, No. 1, (Winter, 1992),p. 1-12.

*DiscoveryVideo zx: User's Guide*, Stenograph Corporation,(1991),30 pgs.

"'CaseView' Advertisement", *Journal of Court Reporting*, 53 (5), (1992),2 pgs.

"'CaseView' Commands", Product Brochure, Stenograph Corporation,(Dec. 14, 1992),1 pg.

"'Discovery': Quick Reference Card", Product Brochure, Xscribe Corporation,(2001),3 pgs.

"A Computer-Integrated Courtroom: A Cost-Benefit Analysis of a United States District Court", *The Circuit Rider*, (Jul.-Sep. 1993),13, 15, 17, 19.

"U.S. Appl. No. 08/036,488, Non-Final Office Action mailed Sep. 27, 1993", 2 pgs.

"U.S. Appl. No. 08/036,488, Notice of Allowance mailed Apr. 20, 1994", 5 pgs.

"U.S. Appl. No. 08/036,488, Preliminary Amendment mailed Jul. 23, 1993", 1 pgs.

"U.S. Appl. No. 08/036,488, Response filed Mar. 28, 1994 to Non-Final Office Action mailed Sep. 27, 1993", 16 pgs.

"U.S. Appl. No. 08/065,132, Final Office Action mailed Dec. 13, 1995", 16 pgs.

"U.S. Appl. No. 08/065,132, Non-Final Office Action mailed Jan. 24, 1995", 1 pg.

"U.S. Appl. No. 08/065,132, Notice of Appeal filed Mar. 13, 1997", 2 pgs.

"U.S. Appl. No. 08/065,132, Response filed Jun. 26, 1995 to Non-Final Office Action mailed Jan. 24, 1995", 12 pgs.

"U.S. Appl. No. 08/065,163, Response filed Jul. 10, 1995 to Non-Final Office Action mailed Feb. 9, 1995", 8 pgs.

"U.S. Appl. No. 08/065,163, Non-Final Office Action mailed Feb. 9, 2005", 12 pgs.

"U.S. Appl. No. 08/065,163, Notice of Allowance mailed Sep. 25, 1995", 2 pgs.

"U.S. Appl. No. 08/065,163, Preliminary Amendment filed Feb. 1, 1995", 6 pgs.

"U.S. Appl. No. 08/066,948, Advisory Action mailed Apr. 10, 1998", 2 pgs.

"U.S. Appl. No. 08/066,948, Advisory Action mailed May 1, 1998", 2 pgs.

"U.S. Appl. No. 08/066,948, Final Office Action mailed Mar. 11, 1997", 3 pgs.

"U.S. Appl. No. 08/066,948, Final Office Action mailed Mar. 23, 1998", 4 pgs.

"U.S. Appl. No. 08/066,948, Non-Final Office Action mailed Mar. 29, 1994", 4 pgs.

"U.S. Appl. No. 08/066,948, Non-Final Office Action mailed Dec. 22, 1994", 4 pgs.

"U.S. Appl. No. 08/066,948, Notice of Allowance mailed Aug. 14, 1998", 4 pgs.

"U.S. Appl. No. 08/066,948, Response filed Apr. 2, 1998 to Final Office Action mailed Feb. 23, 1998", 3 pgs.

"U.S. Appl. No. 08/066,948, Response filed Apr. 22, 1998 to Advisory Action mailed Apr. 10, 1998", 4 pgs.

"U.S. Appl. No. 08/066,948, Response filed Jun. 22, 1995 to Non-Final Office Action mailed Dec. 22, 1994", 2 pgs.

"U.S. Appl. No. 08/066,948, Response filed Jul. 23, 1998 to Final Office Action mailed Mar. 23, 1998", 4 pgs.

"U.S. Appl. No. 08/066,948, Response filed Sep. 29, 1994 to Non-Final Office Action mailed Mar. 29, 1994", 9 pgs.

"U.S. Appl. No. 08/073,809, Non-Final Office Action mailed Feb. 17, 1994", 13 pgs.

"U.S. Appl. No. 08/073,809, Non-Final Office Action mailed Sep. 20, 1994", 3 pgs.

"U.S. Appl. No. 08/073,809, Response filed Aug. 17, 1994 to Non-Final Office Action mailed Feb. 17, 1994", 8 pgs.

"U.S. Appl. No. 08/326,742, Notice of Allowance mailed Feb. 22, 1995", 3 pgs.

"U.S. Appl. No. 08/326,742, Preliminary Amendment mailed Oct. 20, 1994", 5 pgs.

"U.S. Appl. No. 08/339,771, Non-Final Office Action mailed Mar. 22, 1995", 3 pgs.

"U.S. Appl. No. 08/339,771, Notice of Allowance mailed Jan. 8, 1996", 2 pgs.

"U.S. Appl. No. 08/339,771, Preliminary Amendment mailed Nov. 15, 1994", 4 pgs.

"U.S. Appl. No. 08/339,771, Response filed Aug. 22, 1995 to Non-Final Office Action mailed Mar. 22, 1995", 2 pgs.

"U.S. Appl. No. 08/518,102, Notice of Allowance mailed Feb. 9, 1996", 4 pgs.

"U.S. Appl. No. 08/518,102, Preliminary Amendment mailed Aug. 22, 1995", 3 pgs.

"U.S. Appl. No. 08/818,402, Final Office Action mailed Mar. 23, 1999", 6 pgs.

"U.S. Appl. No. 08/818,402, Non-Final Office Action mailed Jun. 26, 1998", 2 pgs.

"U.S. Appl. No. 08/818,402, Non-Final Office Action mailed Sep. 21, 1998", 5 pgs.

"U.S. Appl. No. 08/818,402, Non-Final Office Action mailed Nov. 26, 1997", 5 pgs.

"U.S. Appl. No. 08/818,402, Non-Final Office Action mailed Dec. 30, 1998", 4 pgs.

"U.S. Appl. No. 08/818,402, Notice of Allowance mailed Apr. 30, 1999", 3 pgs.

"U.S. Appl. No. 08/818,402, Preliminary Amendment mailed Mar. 25, 1998", 15 pgs.

"U.S. Appl. No. 08/818,402, Response filed Jan. 15, 1999 to Non-Final Office Action mailed Dec. 30, 1998", 7 pgs.

"U.S. Appl. No. 08/818,402, Response filed Apr. 12, 1999 to Final Office Action mailed Mar. 23, 1999", 4 pgs.

"U.S. Appl. No. 08/818,402, Response filed Jul. 10, 1998 to Non-Final Office Action Jun. 26, 1998", 4 pgs.

"U.S. Appl. No. 08/818,402, Response filed Oct. 20, 1998 to Non-Final Office Action mailed Sep. 21, 1998", 8 pgs.

"U.S. Appl. No. 08/877,719, Notice of Allowance mailed Dec. 21,1998", 5 pgs.

"U.S. Appl. No. 09/057,650, Non-Final Office Action mailed Apr. 9, 1999", 6 pgs.

"U.S. Appl. No. 09/057,650, Non-Final Office Action mailed Jun. 2, 1999", 5 pgs.

"U.S. Appl. No. 09/057,650, Non-Final Office Action mailed Sep. 22, 1998", 4 pgs.

"U.S. Appl. No. 09/057,650, Notice of Allowance mailed Jul. 19, 1999", 5 pgs.

"U.S. Appl. No. 09/057,650, Response filed Jun. 11, 1999 to Non-Final Office Action mailed Jun. 2, 1999", 2 pgs.

"U.S. Appl. No. 09/057,650, Response filed Oct. 5, 1998 to Non-Final Office Action mailed Sep. 22, 1998", 5 pgs.

"U.S. Appl. No. 09/057,780, Non-Final Office Action mailed Sep. 3, 1998", 13 pgs.

"U.S. Appl. No. 09/057,780, Notice of Allowance mailed Nov. 3, 1998", 3 pgs.

"U.S. Appl. No. 09/057,780, Response filed Sep. 24, 1998 to Non-Final Office Action mailed Sep. 3, 1998", 7 pgs.

"U.S. Appl. No. 09/144,576, Notice of Allowance mailed May 10, 1999", 5 pgs.

"U.S. Appl. No. 09/144,576, Preliminary Amendment mailed Aug. 31, 1998", 6 pgs.

"U.S. Appl. No. 09/144,576, Preliminary Amendment mailed Sep. 21, 1998", 2 pgs.

"U.S. Appl. No. 09/144,576, Preliminary Amendment mailed Nov. 6, 1998", 4 pgs.

"U.S. Appl. No. 09/144,582, Non-Final Office Action mailed Dec. 8, 1998", 10 pgs.

"U.S. Appl. No. 09/144,582, Notice of Allowance mailed Mar. 10, 1999", 4 pgs.

"U.S. Appl. No. 09/144,582, Preliminary Amendment filed Aug. 31, 1998", 5 pgs.

"U.S. Appl. No. 09/144,582, Response filed Feb. 5, 1999 to Non-Final Office Action mailed Dec. 8, 1998", 5 pgs.

"U.S. Appl. No. 09/185,114, Non-Final Office Action mailed Apr. 13, 1999", 4 pgs.

"U.S. Appl. No. 09/185,114, Non-Final Office Action mailed Jul. 21, 1999", 5 pgs.

"U.S. Appl. No. 09/185,114, Notice of Allowance mailed Oct. 25, 1999", 3 pgs.

"U.S. Appl. No. 09/185,114, Preliminary Amendment mailed Nov. 3, 1998", 11 pgs.

"U.S. Appl. No. 09/185,114, Response filed Apr. 23, 1999 to Non-Final Office Action mailed Apr. 13, 1999", 7 pgs.

"U.S. Appl. No. 09/185,114, Response filed Aug. 5, 1999 to Non-Final Office Action mailed Jul. 21, 1999", 3 pgs.

"U.S. Appl. No. 09/330,516, Final Office Action mailed Oct. 19, 2000", 24 pgs.
"U.S. Appl. No. 09/330,516, Non-Final Office Action mailed Apr. 6, 2000", 12 pgs.
"U.S. Appl. No. 09/330,516, Preliminary Amendment mailed Jun. 11, 1999", 3 pgs.
"U.S. Appl. No. 09/330,516, Response filed Sep. 6, 2000 to Non-Final Office Action mailed Apr. 6, 2000", 10 pgs.
"U.S. Appl. No. 09/332,317, Advisory Action mailed Jul. 12, 2005", 2 pgs.
"U.S. Appl. No. 09/332,317, Final Office Action mailed Mar. 14, 2005", 9 pgs.
"U.S. Appl. No. 09/332,317, Final Office Action mailed Apr. 27, 2005", 14 pgs.
"U.S. Appl. No. 09/332,317, Non-Final Office Action mailed Jan. 22, 2003", 7 pgs.
"U.S. Appl. No. 09/332,317, Non-Final Office Action mailed Feb. 2, 2006", 4 pgs.
"U.S. Appl. No. 09/332,317, Non-Final Office Action mailed Mar. 8, 2002", 7 pgs.
"U.S. Appl. No. 09/332,317, Non-Final Office Action mailed Apr. 20, 2001", 10 pgs.
"U.S. Appl. No. 09/332,317, Non-Final Office Action mailed Oct. 1, 2003", 8 pgs.
"U.S. Appl. No. 09/332,317, Non-Final Office Action mailed Nov. 6, 2000", 17 pgs.
"U.S. Appl. No. 09/332,317, Notice of Allowance mailed Feb. 22, 2007", 7 pgs.
"U.S. Appl. No. 09/332,317, Notice of Allowance mailed Dec. 20, 1999", 5 pgs.
"U.S. Appl. No. 09/332,317, Preliminary Amendment mailed Jun. 14, 1999", 6 pgs.
"U.S. Appl. No. 09/332,317, Response filed Feb. 6, 2001 to Non-Final Office Action mailed Nov. 6, 2000", 3 pgs.
"U.S. Appl. No. 09/332,317, Response filed Mar. 30, 2004 to Non-Final Office Action mailed Oct. 1, 2003", 14 pgs.
"U.S. Appl. No. 09/332,317, Response filed May 25, 2005 to Supplemental Final Office Action mailed Apr. 27, 2005", 11 pgs.
"U.S. Appl. No. 09/332,317, Response filed Jul. 21, 2003 to Non-Final Office Action mailed Jan. 22, 2003", 5 pgs.
"U.S. Appl. No. 09/332,317, Response filed Sep. 6, 2002 to Non-Final Office Action mailed Mar. 8, 2002", 3 pgs.
"U.S. Appl. No. 09/332,317, Response filed Oct. 17, 2001 to Non-Final Office Action mailed Jan. 3, 2002", 7 pgs.
"U.S. Appl. No. 09/345,910, Notice of Allowance mailed Sep. 7, 1999", 6 pgs.
"U.S. Appl. No. 09/345,910, Preliminary Amendment filed Aug. 30, 1999", 2 pgs.
"U.S. Appl. No. 09/422,202, Non-Final Office Action mailed Jul. 16, 2007", 3 pgs.
"U.S. Appl. No. 09/422,202 Response filed Jan. 16, 2008 to Non-Final Office Action mailed Jul. 16, 2007", 12 p.
"U.S. Appl. No. 09/422,202, Non-Final Office Action mailed Oct. 17, 2006", 6 pgs.
"U.S. Appl. No. 09/422,202, Non-Final Office Action mailed Oct. 24, 2003", 7 pgs.
"U.S. Appl. No. 09/422,202, Preliminary Amendment filed Oct. 19, 1999", 3 pgs.
"U.S. Appl. No. 09/422,202, Preliminary Amendment mailed Apr. 17, 2000", 6 pgs.
"U.S. Appl. No. 09/422,202, Response filed Apr. 17, 2007 to Non-Final Office Action Mailed Oct. 17, 2006", 11 pgs.
"U.S. Appl. No. 09/498,192, Notice of Allowance mailed Apr. 24, 2001", 4 pgs.
"U.S. Appl. No. 09/498,192, Preliminary Amendment filed Feb. 3, 2000", 10 pgs.
"U.S. Appl. No. 09/500,559, Non-Final Office Action mailed Sep. 5, 2001", 8 pgs.
"U.S. Appl. No. 09/808,722, Non-Final Office Action mailed Jan. 29, 2007", 7 pgs.
"U.S. Appl. No. 09/808,723, Non-Final Office Action mailed Jan. 29, 2007", 7 pgs.
"U.S. Appl. No. 09/837,752 Notice of Allowance mailed Jan. 2, 2008", 6 pgs.
"U.S. Appl. No. 09/837,752, Amendment and Response filed Dec. 4, 2006 to Final Office Action mailed Sep. 25, 2006", 3 pgs.
"U.S. Appl. No. 09/837,752, Final Office Action mailed Jun. 25, 2004", 7 pgs.
"U.S. Appl. No. 09/837,752, Final Office Action mailed Sep. 25, 2006", 7 pgs.
"U.S. Appl. No. 09/837,752, Final Office Action mailed Nov. 2, 2005", 10 pgs.
"U.S. Appl. No. 09/837,752, Non-Final Office Action mailed May 20, 2005", 6 pgs.
"U.S. Appl. No. 09/837,752, Non-Final Office Action mailed Sep. 24, 2003", 7 pgs.
"U.S. Appl. No. 09/837,752, Non-Final Office Action mailed Dec. 18, 2002", 7 pgs.
"U.S. Appl. No. 09/837,752, Notice of Allowance mailed Jan. 10, 2007", 4 pgs.
"U.S. Appl. No. 09/837,752, Notice of Allowance mailed Mar. 31, 2006", 4 pgs.
"U.S. Appl. No. 09/837,752, Notice of Allowance mailed Jun. 18, 2007", 5 pgs.
"U.S. Appl. No. 09/837,752, Preliminary Amendment filed Apr. 17, 2001", 5 pgs.
"U.S. Appl. No. 09/837,752, Response filed Mar. 23, 2004 to Non-Final Office Action mailed Jan. 16, 2004", 7 pgs.
"U.S. Appl. No. 09/837,752, Response filed Jun. 17, 2003 to Non-Final Office Action mailed Dec. 18, 2002", 6 pgs.
"U.S. Appl. No. 09/837,752, Response filed Aug. 22, 2005 to Non Final Office Action mailed May 20, 2005", 8 pgs.
"U.S. Appl. No. 09/940,775, Amendment filed May 17, 2002", 6 pgs.
"U.S. Appl. No. 09/940,775, Non-Final Office Action mailed Feb. 26, 2002", 4 pgs.
"U.S. Appl. No. 09/940,775, Notice of Allowance mailed May 14, 2002", 4 pgs.
"U.S. Appl. No. 09/940,775, Notice of Allowance mailed May 22, 2002", 2 pgs.
"U.S. Appl. No. 09/940,775, Preliminary Amendment mailed Aug. 27, 2001", 11 pgs.
"U.S. Appl. No. 09/940,775, Response Filed Mar. 19, 2002 to Non-Final Office Action mailed Feb. 26, 2002", 3 pgs.
"U.S. Appl. No. 11/559,216, Notice of Allowance mailed Dec. 31, 2007", 6 pgs.
"U.S. Appl. No. 11/559,216, Preliminary Amendment filed Jul. 20, 2007", 3 pgs.
"U.S. Appl. No. 11/559,216, Preliminary Amendment filed Nov. 13, 2006", 4 pgs.
"U.S. Appl. No. 11/559,233, Preliminary Amendment mailed Nov. 13, 2006", 5 pgs.
"U.S. Appl. No. 11/559,236, Non-Final Office Action mailed Jan. 2, 2008", OARN, 6 pgs.
"U.S. Appl. No. 11/559,236, Preliminary Amendment filed Jul. 20, 2007", 4 pgs.
"U.S. Appl. No. 11/559,236, Preliminary Amendment filed Nov. 13, 2006", 4 pgs.
"U.S. Appl. No. 11/559,246, Preliminary Amendment Nov. 13, 2006", 5 pgs.
"U.S. Appl. No. 11/559,251, Preliminary Amendment filed Nov. 13, 2006", 5 pgs.
"U.S. Appl. No. 11/559,264, Preliminary Amendment filed Nov. 13, 2006", 5 pgs.
"U.S. Appl. No. 11/559,283, Preliminary Amendment filed Nov. 13, 2006", 4 pgs.
"U.S. Appl. No. 11/559,299, Preliminary Amendment filed Nov. 13, 2006", 4 pgs.
"U.S. Appl. No. 11/559,312, Preliminary Amendment filed Feb. 20, 2007", 4 pgs.
"U.S. Appl. No. 11/559,312, Preliminary Amendment filed Nov. 13, 2006", 3 pgs.
"U.S. Appl. No. 11/779,771, Preliminary Amendment filed Jul. 18, 2007", 4 pgs.
"U.S. Appl. No. 9/144,591, Non-Final Office Action mailed Jan. 7, 1999", 10 pgs.

"U.S. Appl. No. 9/144,591, Notice of Allowance mailed Jun. 3, 1999", 4 pgs.
"U.S. Appl. No. 9/144,591, Preliminary Amendment filed Aug. 31, 1998", 5 pgs.
"U.S. Appl. No. 9/144,591, Response filed Apr. 7, 1999 to Non-Final Office Action mailed Jan. 7, 1999", 7 pgs.
"Caseview: The Attorney's Future Connection", Transcription of 1992 Videotape, Stenograph Corporation,(1992),5 pgs.
"CIC Receive Reference Manual (Rev. A)", OZ PC,(Aug. 1990),p. 1-17.
"Court speeds justice by putting records and court papers on-line", *PC Week*, 5, Obtained from Dialog, Accession No. 03083868,(Mar. 29, 1988),3 p.
"Definition of 'Terminal'", [on-line]. [retrieved Feb. 23, 2004]. Retrieved from the Internet: <URL: http://dictionary/reference.com/search?q=terminal>,5 pgs.
"Definition of 'Terminal'", *IBM Dictionary of Computing*, McDaniel, G., Editor, McGraw-Hill Inc.,(Aug. 1993),p. 686.
"Definition of 'Terminal'", *Ninth New Collegiate Dictionary*, Merriam-Webster, Inc., Springfield, MA,(1985),p. 1217.
"Discovery Products Annouces DiscoveryRealtime Compatibility With DiscoveryPro Software", *Business Wire*, (Mar. 26, 1996),1 pg.
"Discovery Video zx Litigation System", Product Brochure, Stenograph Legal Services, Inc., San Ramon, CA,2 pgs.
"Discovery ZX: Quick Reference Card", Labeled: 'David Langford, CSR, CM, 1991 NCRA Midyear Seminar, New Orleans Marriott, RealTime Spectacular, Part 3, The Computer-Integrated Courtroom, Saturday, Apr. 27, 1991',(1991),4 pgs.
"DiscoveryVideo zx by Stenograph Legal Services", Product Brochure, Stenograph Legal Services, National Sales Meeting, St. Charles, IL,(Jul. 1991),6 pgs.
"Have You Been Dreaming About Little Voices?", 'Discovery Video zx' Product Advertisement, Stenograph Legal Services, Inc.,(1991),1 pg.
"Instructions—OZpc Video zx CONVERT Program", Stenograph Legal Services, San Leandro, CA,(1991),35 pgs.
"International Application Serial No. PCT/US94/03218, International Search Report mailed Sep. 14, 1994", 5 pgs.
"Legal Tech'88 Visitors View Automated Support Systems", *Government Computer News*, 7, (Apr. 1, 1988), 1 p.
"LiveNote Tutorial (Version 1.0)", *LiveNote: User's Guide*, LiveNote Technologies,p. 12, 20, 21, 65, 74, 97-99, 117-120, 141, 142, 166, 167, 192, 193, 203-207, 237 (25 pgs.).
"Menu Selection for Realtime Discovery in XCIC", *Exhibit to Declaration of Brent Sandstorm, Engate, Inc. v. Esquire Deposition Services, LLC (USDC, ND of Ill)*, [page from Ref. i.d. # 237734—no need to cite separately], (prior to Oct. 31, 2003), 1 pg.
"OZ: Computer-Integrated Courtroom Reporter Guide", BaronData Systems,(1988),p. 4-4-4-5.
"Print-out of Database Search for 'Stenograph, LLC/ . . . Stenograph Computer Systems, Inc'", Retrieved from the Internet: <URL: http://www.loc.gov/cgi-bin/formprocessor/copyright/locis.pl>,(retrieved Feb. 27, 2004),9 pgs.
"Realtime Software for Attorneys", [online]. [retrieved on Apr. 2, 2003]. Retrieved from the Internet: <URL: http://www.depo.com/rtsoftware.htm>,1 pg.
"Stenograph Legal Services Unveils New Litigation Support Project", Press Release, Stenograph Corporation,(Apr. 12, 1991),3 pgs.
"Technologies in Court Reporting", Program Materials, Institute for Court Management of the National Center for State Courts and National Court Reporters Association, San Diego, CA,(Mar. 20-22, 1991),Tab 1: p. 1-20; Tab 5: p. 1-47.
"The Courtroom of the Future", *Time*, (Aug. 4, 1986),1 pg.
Andrews, F. , "Computer-Integrated Courtrooms: Enhancing Advocacy", *Trial*, (Sep., 1992),37-39.
Berry, R. L., et al., "Conducting Depositions Anywhere", *The National Law Journal*, (2001),p. B-15-B-17.
Bichy, C. L., "Innovative Partnership Produces Technology Laboratory", *Journal of Court Reporting*, (Mar. 1992),p. 28.
Block, M. H., "Moving the Judicial System into the Twenty-First Century", *Trial*, (Sep. 1990),51-52.

Brentano, M. , "A History of CAT—From the CIA to the CIC", *NSR*, (Jul. 1990),24-26.
Cusack, S. , "Reading with electronic eyes", *Computerworld*, (Oct. 1, 1990),p. 41.
Dagdigian, D. , "Update: Computerized Federal—Chicago", *NSR*, (Jul. 1987),p. 26.
Dean, S. , "Teaching Attorneys and the Public About Our Technologies", *Journal of Court Reporting*, (Apr. 1992),26-30.
Forerstel, K. , "House Debate Now Available Closed-Caption", *Roll Call*, obtained from LexisNexis,(Feb. 25, 1991),1 pg.
Fruke, L. M., "How Do You Furnish a CIC?", *NSR*, (Aug. 1990),p. 71.
Hazlett, B. , "Computer Also on Trial in L.A. Courtroom", *Los Angeles Times*, (1982),p. 3, p. 24.
Johnston, D. R., "Computers: Shorthand for Change", *Fulton County Daily Report*, (Mar. 13, 1989),2 pgs.
Karlovits, J. R., "TAC and Its Effect on Our Profession", *Journal of Court Reporting*, (Jul. 1992),24-25.
Karlovits, J. R., "What Is a Computer-Integrated Courtroom. Anyway?", *NSR*, (Feb. 1990),p. 72.
Knapp, M. H., *The Complete Court Reporter's Handbook*, Second Edition, Regents/Prentice Hall, Englewood Cliffs, NJ,(1991),327-328.
Knox, D. , "Phoenix's Courtroom of the Future", *The American Lawyer—Technology*, (1991),p. 4-6, p. 10.
Madden, R. F., "The Coming of the Electronic Courtroom", *Yearbook of Law Computers and Technology*, vol. 5, (1991),p. 9-18.
Malt, L. , "Behind the Screen: Getting Captions on the Air", *Electronic Media*, Obtained from LexisNexis,(Mar. 19, 1990),2 pgs.
McNutt, III, W. A., "Courtrooms—Phoenix", *NSR*, (Jul. 1987),p. 27.
Nelson, F. O., "A Real-Time Case History", *NSR*, (May 1989),p. 22.
Plotnikoff, J. , et al., *Evaluation of the Smith Bernal Real-Time Computer Aided Transcript System, Solution CIC*, Report on behalf of Society for Computers and Law,(Apr. 1992),p. 1-23.
Plotnikoff, J. , et al., "Replacing the Judge's Pen?Evaluation of a Real-Time Transcription System", *International Journal of Law and Information Technology*, 1(1), (1993),90-106.
Prout, Jr., J. J., "Technology to Help the Disabled and Everyone Else", *New Jersey Lawyer*, (Dec. 21, 1992),2 pgs.
Rabiner, L. , et al., *In: Fundamentals of Speech Recognition*, Prentice Hall PTR, Englewood Cliff, NJ,(1993),pp. 1, 478-479.
Rizman, S. , "Total Access Courtroom—Unveiled in New Jersey", *The Journal of Court Reporting*, (Dec. 1992),36-37, 39.
Rogner, B. M., "The Courtroom of the Future", *NSR*, (May 1985),18-19.
Rothman, R. L., "The Computer Age is Coming, The Computer Age is Coming", *Litigation News*, 16 (4), (1991),2 pgs.
Sanchez, M. A., "The Computer-Integrated Courtroom", *Hearsay*, (Oct. 1990),4 pgs.
Sanchez, M. , et al., "The Phoenix CIC Six Years Later", *Journal of Court Reporting*, (Apr. 1992),49-50, 52.
Shorak, B. J., "Computer Courtrooms—Views of the National Shorthand Reporters Association", *The Advocate*, (Oct. 1989),42-43.
Strand, R. G., *The Computer-Integrated Courtroom: A Demonstration*, Federal Judicial Center, Conference of Chief District Judges, Phoenix, Arizona,(Apr. 6, 1989),p. 1-14.
Strand, R. C., "The Courtroom of the Future", *The Judge's Journal*, 28(2), (Spring, 1989),9-11, 47-48.
Williams, J. , et al., *Advanced Court Report Technology—Computer Concepts*, Middletown/Wasley Publishing,p. 6-2-6-5.
Wolffe, J. , *United Press International: Domestic News*, Re: Real-Time Close Captioning, Nov. 15, 1991, Friday, BC Cycle,2 pgs.
"U.S. Appl. No. 09/422,202, Non-Final Office Action mailed May 22, 2008", 18 pgs.
"U.S. Appl. No. 11/559,236, Response filed Jul. 2, 2008 to Non Final Office Action mailed Jan. 2, 2008", 7 pgs.
"U.S. Appl. No. 11/559,246 Non-Final Office Action mailed Oct. 3, 2008.", 21 pgs.
"U.S. Appl. No. 11/559,264 Non-Final Office Action mailed Jul. 2, 2008", 20pgs.

* cited by examiner

DOWN-LINE TRANSCRIPTION SYSTEM USING AUTOMATIC TRACKING AND REVENUE COLLECTION

CROSS-REFERENCE TO RELATED APPLICATIONS

This application is a continuation of U.S. patent application Ser. No. 09/422,202, filed Oct. 19, 1999, now U.S. Pat. No. 7,631,343, which:

1) is a continuation-in-part of U.S. patent application Ser. No. 09/185,114, filed Nov. 3, 1998, now U.S. Pat. No. 6,023,675, issued Feb. 8, 2000, which is a continuation of U.S. patent application Ser. No. 09/057,650, filed Apr. 9, 1998, now U.S. Pat. No. 5,970,141, issued Oct. 19, 1999, which is a divisional of U.S. patent application Ser. No. 08/818,402, filed Mar. 12, 1997, now U.S. Pat. No. 5,949,952, issued Sep. 7, 1999, which is a continuation-in-part of U.S. Pat. Ser. No. 08/339,771, filed Nov. 15, 1994, now U.S. Pat. No. 5,740,245, issued Apr. 14, 1998, which is a continuation of U.S. patent application Ser. No. 08/066,948, filed May 24, 1993, now U.S. Pat. No. 5,878,186, issued Mar. 2, 1999, which is a continuation of U.S. patent application Ser. No. 08/036,488, filed Mar. 24, 1993, now U.S. Pat. No. 5,369,704, issued Nov. 29, 1994; and 2) claims the benefit of U.S. Provisional Patent Application Ser. No. 60/140,760, filed Jun. 24, 1999.

The complete contents of the above referenced U.S. patent applications, U.S. Pat., and U.S. Provisional Patent Application are hereby incorporated by reference in their entirety.

BACKGROUND OF THE INVENTION

This invention relates to a transcription system used by court reporters; and, more particularly, it relates to a method and apparatus incorporating an automatic transcription system for providing real-time use and manipulation of transcribed testimony by attorneys, judges, court reporters, witnesses and clients.

As is well known, legal proceedings such as a deposition or trial involve the participation of, among others, an examining attorney who asks questions and a witness who must answer ("testify") while under oath. These answers ("testimony") are recorded by the court reporter, along with the associated questions and related conversation, using a stenographic recorder. A stenographic recorder is a machine which provides a set of keys which are stroked by the court reporter in various combinations and sequences to represent a spoken word. To provide a backup to the key-strokes, court reporters use a tape recorder to record tile entire proceeding.

Older versions of the stenographic recorder only record the court reporter's key-strokes much the way a computer printer does, creating a paper tape containing the printed key-strokes as a record of the legal proceeding. To the untrained eye, the printed key-strokes are incomprehensible. After the legal proceeding ends, the court reporter reads the paper tape and manually transcribes each printed key-stroke back into the words that were spoken, creating a readable transcript of the testimony. This manual process is herein called "manual, post-processed transcription".

Newer versions of stenographic recorders have been developed and linked to computer aided transcription ("CAT") systems to help automate the manual transcription process. Instead of solely using paper tape recording methods, the stenographic recorder also electronically stores key-strokes in built-in memory or on disk. After using such a newer recorder, the court reporter returns to his office and transfers the electronically stored key-strokes to his CAT system for transcription. Although the bulk of electronically stored key-strokes may be translated automatically, the court reporter must still work interactively with the CAT system to translate those key-strokes which the CAT system could not recognize. This nearly automated transcription process is herein called "automatic, post-processed transcription".

The most recent versions of the stenographic recorder also accommodate "automatic, parallel transcription", by electronically sending each electronically registered key-stroke via a telephone line to a remote CAT system during the legal proceeding. This system requires two court reporters working in parallel: one using the stenographic recorder to record the testimony; and the other, who is familiar with the first reporter's key-stroking style, interacting with the CAT system to carry out the transcription of each key-stroke received. Working in parallel, the court reporters might produce a readable transcript within a few hours after the proceeding has ended.

For all of the transcription systems mentioned above, court reporters often use the tape recorder to aid in translating misheard words and untranslated key-strokes. To locate the corresponding audio on a recorded tape often wastes a great deal of the court reporter's time.

Automatic, parallel transcription systems have also been unsuccessfully used in a configuration to assist a deaf witness in legal proceedings. Taking the place of the second, parallel court reporter in the aforementioned normal scenario, the deaf witness is placed in front of the CAT system. The CAT system translates and displays the bulk of the key-strokes and sequences in real-time so that the deaf person can read the questions asked. One major problem found in this configuration is that the untranslated key-strokes are displayed in an undecipherable form to all but a court reporter. A relatively large number of the questions asked become unintelligible. Furthermore, the fact that the witness is deaf complicates this matter to a point of failure. For every unintelligible question encountered, the court reporter must stop using the stenographic recorder, read the computer screen and then write down the translation by hand on a piece of paper for the witness. As an additional problem the witness's own words annoyingly echo back to the computer screen within a short delay after they are spoken, making it very difficult for the witness to testify without distraction.

The development of the automatic, post-processed and parallel transcription system was driven solely by the court reporter's need to accelerate the transcription process. Using these systems, the court reporter operates more efficiently, handles a larger volume of work and, as a result, reaps greater profit. Using any of these transcription systems, however, a readable transcript is never received by an attorney, judge or witness until some time after the immediate legal proceeding has ended.

There are a variety of problems facing attorneys, judges and witnesses relating to the development of testimony taken in a legal proceeding. The focal point of most of these problems involves the lack of a real-time, readable record of a witness's testimony while that witness is undergoing examination. Reliance must be based upon either the minimal assistance the court reporter might offer or notes taken which often prove to be burdensome, confusing and untrustworthy. Further details of these problems become apparent when evaluating the type of legal proceeding involved.

A deposition proceeding often involves the participation of a witness, court reporter, examining attorney, associate examining attorney, defending attorney and associate defending attorney. Generally, the examining attorney asks questions to which the witness responds with answers. The associate examining attorney assists the examining attorney in conducting this inquiry. The defending attorney, with assistance from the associate defending attorney, evaluates the questions being asked and raises objections when legally improper questions are detected. If a legally improper question occurs but is not detected, the corresponding answer may be used to the detriment of the defending attorney's case. During the entire proceeding, the court reporter records all of the questions, answers, objections and discussions held during the deposition.

In parallel with the court reporter's recording of the proceeding, all attorneys rapidly take notes in which they attempt to summarize what they believe to be the important factors of what they believe they heard the witness say. Although these notes provide a necessary, working record to aid in conducting the deposition, they are often incomplete, mischaracterize or, even worse, completely misconstrue a witness's answers. Relying on such notes often proves to be detrimental.

If an attorney does not understand an answer, he often asks the court reporter to read the answer back from the paper tape record. The examining or defending attorney may also ask for the last answer to be read back if the answer was so lengthy that notes were not taken fast enough to keep up with the witness. Similarly, either attorney may ask the court reporter to read back the last question for a confused witness. When so instructed, the court reporter stops recording, picks up the paper tape output from the stenographic recorder, searches for the portion of the record at issue, and reads the stenographic key-strokes. This reading is often broken with misplaced delays in pronunciation between phonemes and words making it difficult to understand. Furthermore, because searching for a portion of the record in a series of printed key-strokes proves to be very difficult and time consuming, attorneys are forced to limit requests to have only the most recent Q & A's read back.

More specifically, the examining attorney takes notes in order to help formulate questions during a deposition. These notes are referenced particularly as the witness reveals additional evidence about the same subject. If the deposition runs for several days, the examining attorney often reviews each day's notes during the evening in his hotel room in preparation for the next day of deposition. Reviewing cryptic notes taken many hours earlier often causes further misunderstandings which may not be detected until a readable transcript is received. Operating from unreliable notes, the examining attorney might incorrectly: 1) proceed with irrelevant lines of questioning; 2) reopen resolved, important issues—tipping-off the defending attorneys; or 3) abandon unresolved, important lines of questioning.

A major goal of the examining attorney is to establish the proper form of Q & A's which relate to important issues in a case. In furthering this goal, the examining attorney often attempts to embody one or more of the witness's prior answers as part of a new, summarizing question. Because this new question is often based upon unreliable notes or poor memory, the new question mischaracterizes the prior answers. In response, the defending attorney may correctly object if he detects the mischaracterization from his potentially unreliable notes and poor memory. The objection forces the examining attorney to consider either asking the court reporter to try to find and read back the actual Q & A's at issue or re-asking the entire line of questioning again. More importantly, this objection warns the witness to carefully scrutinize each question relating to this subject before answering. As a result, a battle usually results over superfluous terms and phrases, and obtaining proper form is prevented. Furthermore, even if the examining attorney believes proper form has been achieved, he is often reluctant to verify his belief by having the Q & A read back because it serves to alert the defending attorneys that important information may have come to light. Thus, improper form on critical issues often results.

Leeching away his time for, and therefore the reliability of, his note taking, the examining attorney is also faced with a multitude of other tasks such as: 1) analyzing the response of the witness; 2) formulating a follow up question in view of the witnesses response; 3) analyzing the defending attorneys objections to the pending question; 4) evaluating the demeanor of the witness upon each Q & A; 5) reviewing an outline for the next preplanned question or line of questioning; and 6) writing further notes regarding future lines of questioning to be asked or reviewed that evening at the hotel.

To relieve him of some of the burden, the examining attorney often brings an associate examining attorney with him. The associate does several things including: 1) taking notes to fill gaps in the examining attorneys notes at a break or later that evening at the hotel when the two attorneys plan the next day's questions; 2) ordering and finding documentary exhibits for the examining attorney; 3) writing messages on small pieces of paper (usually POST-IT brand notes) and passing them to the examining attorney; 4) monitoring the passed messages so as to withdraw, supplement or replace them when necessary; and 5) keeping track of the documentary exhibits entered into evidence.

While relieving some of the burden upon the examining attorney, the associate examining attorney creates additional burdens. For example, in suggesting a follow-up question, the associate must rapidly compose a brief message and immediately obtain the attention of the examining attorney before the examining attorney changes the line of questioning. As a result, the examining attorney sometimes forgets his own line of questioning. Moreover, these messages tend to be illegible and too brief for the examining attorney to understand. Without supplementation, these messages serve no purpose but to distract.

To suggest new lines of questioning, the associate may casually draft a rather complete message intending for the examining attorney to read the message at the examining attorney's leisure. However, the mere act of passing the note tends to distract the attention of the examining attorney.

The associate attorney may also pass messages to help counter the defending attorneys' objections or pointing out the witness's demeanor in response to a question when the examining attorney is looking elsewhere. Again, this distracts the examining attorney.

Upon receiving a message, the examining attorney must decide when to read it, and, once read, must decide whether and when to use it. If prior to reading the message, the examining attorney asks the question contained therein, the message becomes no more than a distraction. If the examining attorney determines that the message contains a good question, the examining attorney either asks that question immediately and discards the note or saves the note for a later time. At times, an attorney may have ten to fifteen notes in front of him that he must deal with. This is particularly the case where the associate knows more facts about the witness than does the examining attorney, or where the associate attorney is the more senior or more experienced of the two.

As previously stated, the defending attorney must also take summarizing notes regarding both the Q & A's in the deposition. From these notes, the defending attorney attempts to deduce upcoming lines of questioning, specific details of the examining attorney's positions, strengths or weaknesses associated with those positions and objections such as "asked and answered" or "mischaracterizing the testimony". These notes also remind the defending attorney to discuss incorrect statements made by the witness during a break so that the record can be corrected when the deposition resumes.

Among a variety of other duties also detracting from his note taking ability, the defending attorney must object whenever the question is inappropriate and state the reasons for his objections. Not only do these objections address evidentiary concerns, but some attorneys use the objection to warn the witness to scrutinize critical questions posed by the examining attorney as previously described. Furthermore, all such objections must be seasonable, i.e., before the witness answers a pending objectionable question. Note taking tends to detract from the defending attorney's ability to seasonably object and vice versa.

To help alleviate this problem, the defending attorney often brings along an associate defending attorney. Much like the associate examining attorney, the associate defending attorney takes notes and passes messages to the defending attorney. If the note involves making an objection, the defending attorney will rarely be able to make it seasonably. The messages just cannot be drafted, passed and read fast enough. The notes taken do however help fill the gap found in the defending attorney's notes who can then focus on his other duties. In addition, the description of many of the other problems encountered by the examining attorneys are equally applicable here.

During a trial proceeding, both the plaintiff's attorneys and defendant's attorneys take turns assuming the role and duties of the examining and defending attorneys as previously described in the deposition proceedings. In many cases, instead of a single associate attorney, many associate attorneys may participate. The examining attorney at trial is called the "first chair". The most senior associate attorney, if at least one, is called the "second chair" and so on. There may be several "chairs" representing a single client.

The problems described previously relating to a deposition directly, and perhaps more severely, apply to a trial proceeding. This is due in part to the increased number of attorneys involved. Additionally, several different problems associated specifically with the trial proceeding also exist. For example, because the first chair is often on his feet and not near the other chairs on his team, passing messages or note taking proves to be very difficult if not impossible. This communication gap manifests other problems when the first chair attempts to obtain trial exhibits or other supporting materials. Scrambling to draft and pass a message to, or to reach whispering range of, a lower number chair often occurs. Other chairs that could possibly know of the location of the requested material are often oblivious to the request.

Another communication gap exists between the attorneys at trial and those that cannot attend. Only those attorneys present and listening can respond at the proceeding. Non-attendees who might otherwise be able to assist have no means to evaluate the trial or communicate with the attending attorneys.

On the defending attorney's side, the nomenclature using the first chair, second chair and so on is also used. The problems applicable to the defending attorneys during a deposition are also applicable and compounded at trial because of the enhanced significance of the defending attorney's duties beyond those of detailed note taking. As a result, much of the note taking must be left to other chairs.

A judge must monitor, evaluate, and moderate the procedures and substance of the trial proceedings. Each question or line of questioning, answer and exhibit must be carefully analyzed for content, evidentiary form and relevance so that rulings on related objections can be immediately made. If a judge is distracted, he is faced with problems previously enumerated with having to have the court reporter read back from the record. The judge also takes notes relating to various Q & A's or statements made during trial, particularly when ruling on issues of law or fact from the bench. Due to the multitude of duties facing the judge, the judge's note taking is also subject to many of the other previously mentioned problems.

Currently, facing the foregoing problems are over thirty thousand court reporters and hundreds of thousands of attorneys and judges in the United States alone. Hence, it would be highly desirable to solve the foregoing variety of problems enumerated above facing attorneys, judges, court reporters and witnesses in conducting legal proceedings such as a deposition or trial by using and manipulating testimony generated in real-time by an automatic transcription system.

It is therefore an object of the present invention to provide a method and apparatus which will aid the examining attorney's use and manipulation of testimony generated in real-time by an automatic transcription system.

It is another object of the present invention to provide a method and apparatus which aids associate examining attorneys in the use and manipulation of testimony generated in real-time by an automatic transcription system to assist the examining attorney.

It is yet another object of the present invention to provide a method and apparatus which aids the defending attorney in the use and manipulation of testimony generated in real-time by an automatic transcription system.

It is another object of the present invention to provide a method and apparatus which will aid the associate defending attorney's use and manipulation of testimony generated in real-time by an automatic transcription system in assisting the defending attorney.

It is therefore an object of the present invention to provide a method and apparatus which will aid the examining first chair's use and manipulation of testimony generated in real-time by an automatic transcription system.

It is another object of the present invention to provide a method and apparatus which will aid the examining second chair's use and manipulation of testimony generated in real-time by an automatic transcription system in assisting the examining first chair.

It is another object of the present invention to provide a method and apparatus which will aid all examining higher chairs' use and manipulation of testimony generated in real-time by an automatic transcription system in assisting the examining second chair.

It is yet another object of the present invention to provide a method and apparatus which will aid the defending first chair's use and manipulation of testimony generated in real-time by an automatic transcription system.

It is another object of the present invention to provide a method and apparatus which will aid the defending second chairs' use and manipulation of testimony generated in real-time by an automatic transcription system in assisting the defending first chair.

It is another object of the present invention to provide a method and apparatus which will aid all defending higher chairs' use and manipulation of testimony generated in real-time by an automatic transcription system in assisting the defending second chair.

It is a further object of the present invention to provide a method and apparatus which will aid the judge's use and manipulation of testimony generated in real-time by an automatic transcription system.

SUMMARY OF THE INVENTION

These and other objects of the present invention are achieved in a transcription network having a reporter's terminal, an attorney's terminal, and an associate's terminal with a communication link therebetween. Specifically, the attorney's terminal and associate's terminal receive text signals representative of spoken words from the reporter's terminal via the communication link, and display the text. The associate's terminal also provides a means for generating and sending messages via the communication link to the attorney's terminal.

Other objects are also achieved in a transcription system having a terminal, for transcribing signals representative of spoken words into corresponding alphabetic and numeric text, which is linked to a recorder for recording spoken words. A means which operates across the link creates associations between recorded spoken words and corresponding alphabetic and numeric text.

Objects are also achieved in a reporting system having a transcriber node which operates on coded representations of spoken words and having cross-reference and phoneme libraries. Specifically, the reporting system uses the cross-reference library to identify; associations between coded representations of spoken words and corresponding alphabetic and numeric text. Where associations cannot be identified, the reporting system then uses a phoneme library for associating spoken words with pronounceable text.

Objects are also achieved in a reporting system operable on coded representations of spoken words. Particularly, the reporting system comprises a transcriber which cross-references the coded representations of spoken words so as to identify corresponding alphabetic and numeric text. The identified text is then analyzed and, if appropriate, objections to the spoken words are provided.

Objects are also achieved in a transcription network comprising a plurality of terminals each having a display screen which is electrically controllable for visually displaying alphabetic and numeric text. A hierarchical communication link controls the communication flow between the plurality terminals. Each of the terminals send and receive messages via said hierarchical communication link, which provides for selective relaying of messages between said plurality of terminals.

DESCRIPTION OF THE PREFERRED EMBODIMENT

Figure 1:
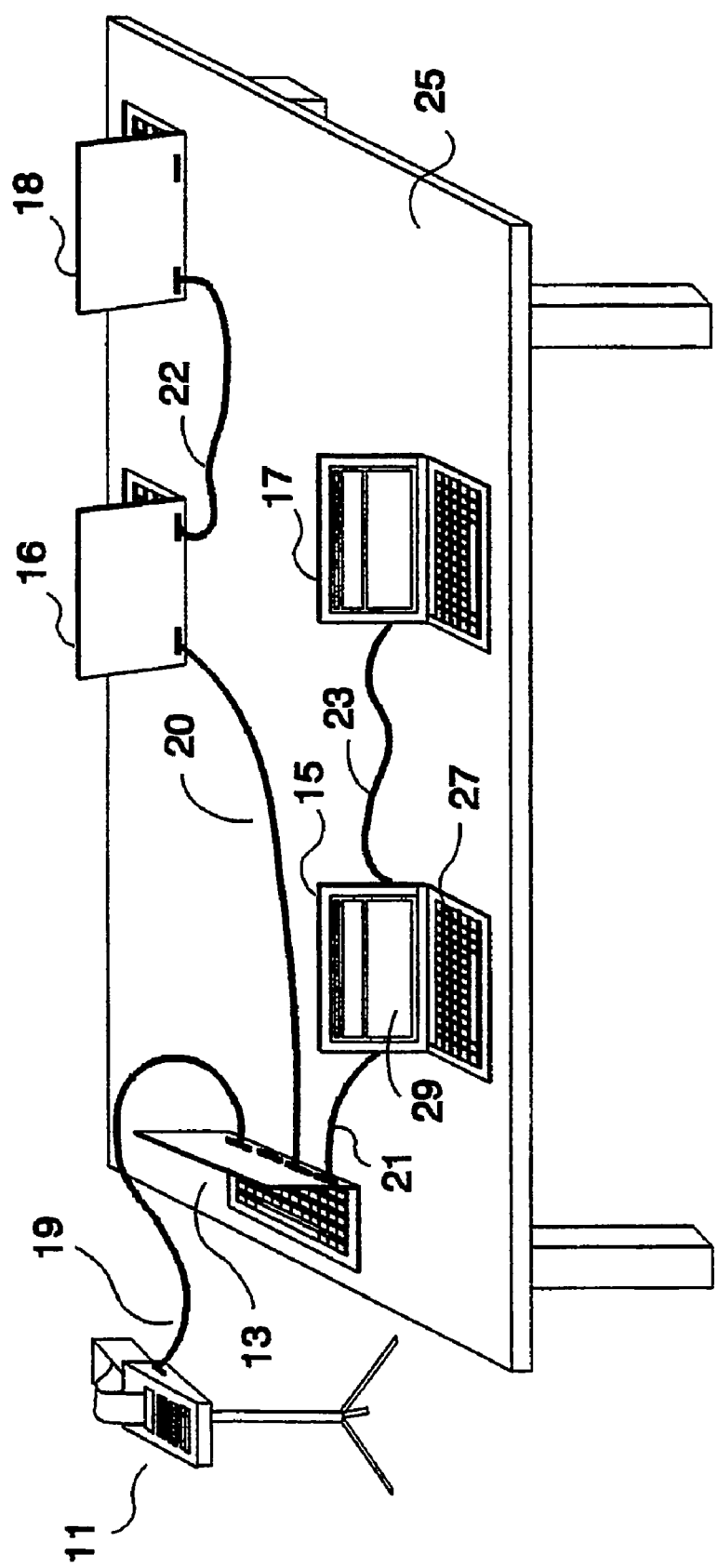
FIG. 1 is a perspective view of an embodiment of an overall system configuration according to the present invention.

FIG. 1 is a perspective view of an embodiment of an overall transcription system configuration according to the present invention. A stenographic recorder 11 is used by a court reporter at a deposition, hearing or other transcription matter, to record digital coded signals representative of verbal communications as they occur in real-time. Using a communication link 19, the recorder 11 transfers the representative signals to a computer aided transcription ("CAT") system 13, a computer terminal used by the court reporter, for transcription into alphabetic and numeric text corresponding to the actual words spoken.

The CAT system 13 communicates the alphabetic and numeric text it generates along two independent communication links 20 and 21 to an examining attorney's terminal 15 and a defending attorney's terminal 16, respectively. The examining attorney's terminal 15 relays the text along a communication link 23 to an associate examining attorney's terminal 17. Likewise, the defending attorney's terminal 16 relays the communicated alphabetic and numeric text representing the spoken words along a communication link 22 to an associate examining attorney's terminal 18. Upon receipt of the communication, the attorney's terminals 15, 16, 17 and 18 display the alphabetic an numeric text and provide a variety of tools for reviewing and evaluating what has been received.

Concurrent with receiving and displaying representative text, the examining terminals 15 and 17 provide a vehicle for the examining and associate examining attorneys to exchange messages. The message exchange occurs through the communication link 23. Similarly, message exchanges between the defending terminals 16 and 18 are provided for via the communication link 22.

As illustrated, the CAT system 13 may be positioned for easy access on a conference room table 25 in front of the court reporter. Also on the table 25, the terminals 15, 17, 16 and 18 may be found positioned in front of an examining attorney, associate examining attorney, defending attorney and associate defending attorney, respectively. Each of the terminals 15, 16, 17 and 18 and the CAT system 13 (the reporter's terminal) all include keyboards 27 and a screen 29. Each screen is flat or planar so as to prevent viewing by the opposing attorneys (and witness) who typically sit on either side of the table, as shown.

Although preferred, neither the keyboard nor the screen are necessary for the CAT system 13. In fact, the terminal itself, i.e., the functionality thereof, might exist within other nodes on the transcription network. For example, the functionality of CAT system 13 might be fully distributed between the recorder 11 and the examining attorney's terminal 15. The functionality might also be located at some remote, off-site location. Similarly, the present invention contemplates many situations where terminals are not available for each attorney present, such as where only the examining side uses terminals or visa versa, or where either side utilizes a single terminal. Situations may arise where no attorneys possess a terminal.

The use of additional terminals is also contemplated by the present invention. Although not shown in FIG. 1, a sixth terminal might be used: 1) for the witness who sits to the left of the defending attorney on the defending attorney's right side; 2) off-site for a magistrate or judge; 3) off-site for a client or expert witness; or 4) off or on site for additional attorneys on the case. These configurations and their advantages and features will be discussed in detailed below.

Figure 2:
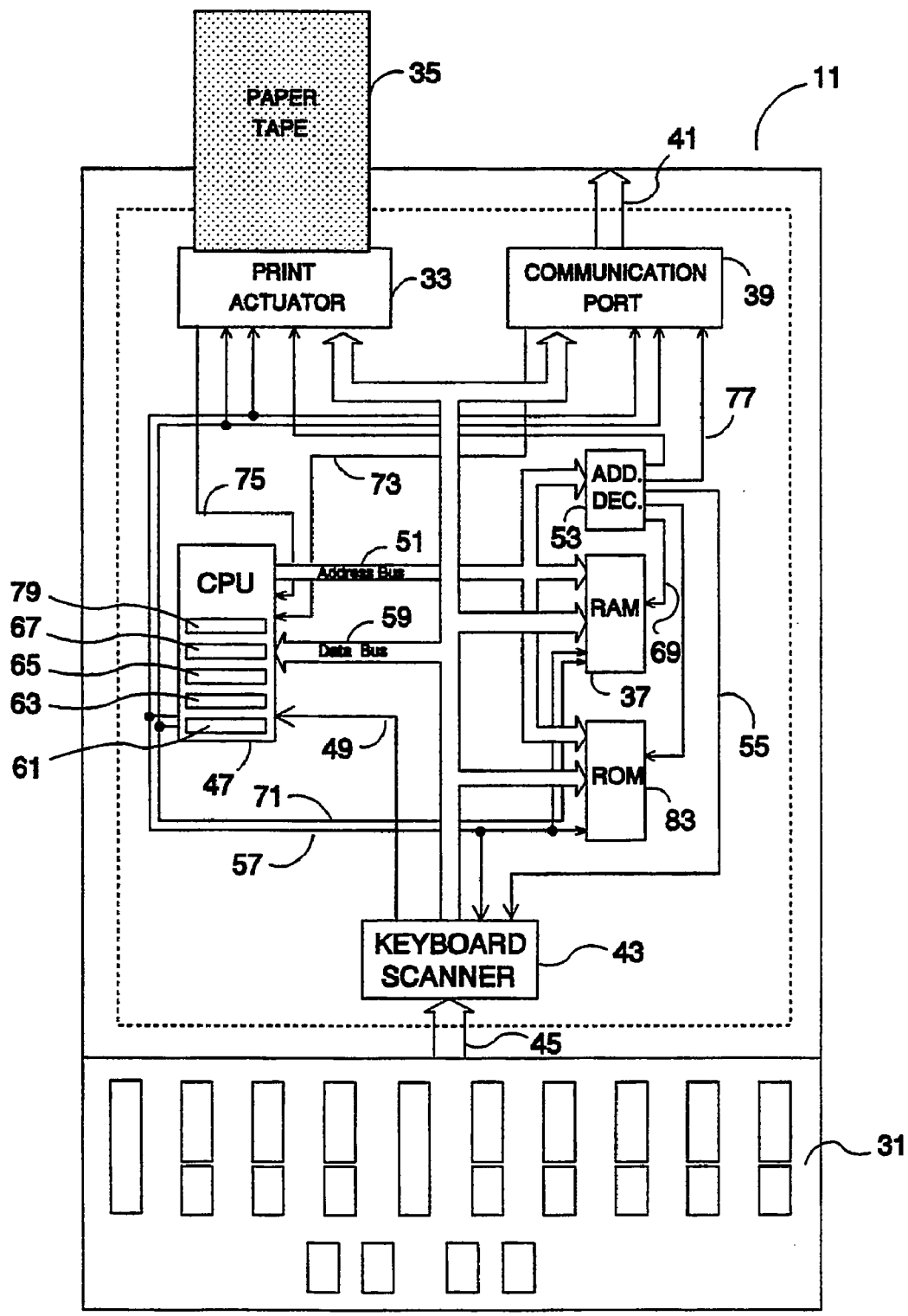
FIG. 2 is a schematic block diagram of an embodiment of the stenographic recorder used in the present invention.

FIG. 2 is a schematic block diagram of an embodiment of the stenographic recorder 11 used to generate digitally coded stenographic signals representing the voice transcript. Recorder 11 includes a keyboard 31 which is actuated by the court reporter in response to the spoken word. The reporter strokes the keyboard by actuating either one key individually or several keys simultaneously to represent phonetically the spoken word or some phonetic portion thereof. Such a key-stroke causes print actuator 33 to print a single line of type representing that key-stroke onto a paper tape 35. Tape 35 is thereafter incrementally scrolled out in preparation for the next key-stroke.

During the deposition, the court reporter may be asked to read back testimony. The reporter does so by sequentially viewing each line of phonetic characters typed onto paper tape 35, mentally translating a single or several lines of characters into words, and then speaking out the phonetic translation. An attorney, judge or witness typically cannot read the phonetic characters typed onto tape 35.

In addition to being printed on paper tape 35, each key-stroke is converted to a digital code which is stored in a random access memory (RAM) 37 and also transmitted by a communication port 39 to CAT system 13 via a serial output bus 41 and communication link 19 (FIG. 1). If print actuator 33 runs out of tape 35, stenographic recorder 11 will still store and transmit the digital key-stroke codes. Similarly, if communication link 19 is disconnected, storage and printing will still occur.

More specifically, a keyboard scanner 43 monitors keyboard 31 via scanning bus 45. Upon each stroking of keyboard 31, keyboard scanner 35 responds by generating a digital key-stroke code representing all of the keys pressed in that stroke. Next, keyboard scanner 43 interrupts a central processing unit ("CPU") 47 via an interrupt line 49. CPU 47 responds to the interrupt by placing the address of keyboard scanner 43 upon an address bus 51. In response, an address decoder 53 generates a select signal on a scanner select line 55 which enables keyboard scanner 43. CPU 47 then places a read enable signal on a read line 57. Keyboard scanner 43 responds by placing the digital key-stroke code on a data bus 59. Next, CPU 47 reads the key-stroke code into an internal key-stroke register 61 and increments a print count register 63, a transmit count register 65 and a memory pointer register 67. The count in register's 63 and 65 represents the back-log of key-stroke codes to be printed and transmitted, respectively. Immediately after the key-stroke code has been read, keyboard scanner 43 removes the interrupt and awaits the court reporter's next stroke.

Having retrieved the key-stroke code, CPU 47 must first save the code and then attempt to transmit and print it. Specifically, from the contents of memory pointer register 67, CPU 47 computes the next available address in RAM 37 and places that address onto address bus 51, while placing the contents of key-stroke register 61 onto data bus 59. In response to the address on address bus 51, address decoder 53 produces a select signal on RAM select line 69, selecting RAM 37. Afterwards, CPU 47 places a write enable signal upon a write line 71, and RAM 37 responds by storing the key-stroke code.

Having saved the key-stroke code, CPU 47 enters a prioritized wait-mode, awaiting an interrupt signal from: 1) keyboard scanner 43 along interrupt line 49, signifying that another key-stroke code has been detected and generated; 2) communication port 39 along interrupt line 73, signifying that port 39 is ready to receive a key-stroke code for transmitting; or 3) print actuator 33 along interrupt line 75, signifying that actuator 33 is ready to receive another key-stroke for printing. Interrupt servicing priority is given to scanner 43, followed by port 39 and actuator 33.

This servicing scheme does not provide first in first out servicing of interrupts. Instead, at the conclusion of servicing any interrupt, CPU 47 enters the prioritized wait-mode and, first, unmasks interrupt line 49 from scanner 43. If an interrupt is present, CPU 47 exits the wait-mode and services scanner 43. Otherwise, with no interrupt from scanner 43, CPU 47 examines the backlog count in registers 63 and 65. If neither contain a backlog, CPU 47 waits solely for an interrupt from scanner 43.

If one or both contain a backlog, priority is given to the register with the largest backlog or to transmit count register 65 if the registers are equal. With this priority, CPU 47 unmasks the corresponding interrupt line. If the corresponding device has provided an interrupt signal signifying that it is ready, CPU 47 will exit the wait-mode and service that device. Otherwise, if that device is not ready, CPU 47 will unmask the final interrupt line. At this point, CPU 47 will service the first interrupt that occurs. Finally, before servicing any interrupt, CPU 47 masks all interrupts.

Having described the prioritization scheme and the servicing of keyboard scanner 43, we move on to servicing communication port 39. As previously detailed, during the servicing of scanner 43, transmit count register 65 contains a backlog count of at least one, signifying the need to transmit. The count in register 65 directly represents the binary number of key-strokes that have been stored but not transmitted. If register 65 contains a binary value of one at the time CPU 47 responds with servicing, CPU 47 will place the address of communications port 39 onto address bus 51, while placing the contents of key-stroke register 61 (the recently received key-stroke code) onto data bus 59. Address decoder 53 responds by placing an enabling signal on port select line 77, selecting communications port 39. CPU 47 next places a write enable signal upon write line 71, causing the key-stroke code on data bus 59 to be written to communication port 39.

Upon receiving the key-stroke code, port 39 removes the interrupt signal from interrupt line 48 until the key-stroke code is transmitted to CAT system 13 via communication link 19 (see FIG. 1). CPU 47 exits the servicing routine and enters the prioritized wait-mode.

If, however, transmit count register 65 reveals a greater backlog than just one, CPU 47 must retrieve the oldest un-sent key-stroke code from RAM 37 before sending it to communication port 39 as described above. To retrieve the oldest un-sent keystroke code, CPU 47 calculates the address of the oldest keystroke code by subtracting the contents of transmit count register 65 from memory pointer register 67 and placing that value on address bus 51. Address decoder 53 responds by selecting RAM 37 via RAM select line 69. Next, CPU 47 provides a read enable signal on read line 57 which causes RAM 37 to place the oldest un-sent key-stroke code onto data bus 59. CPU 47 then reads this key-stroke code into an auxiliary register 79, completing the retrieval. Finally, the same steps described above are engaged in by CPU 47 to write this key-stroke code (stored in auxiliary register 79) to communication port 39.

In an identical manner, responding to interrupt line 75, CPU 47 services print actuator 43 utilizing address decoder 53's selection of actuator 33 (via actuator select line 81) and either print count register 63 or auxiliary register 79 as necessary. The details therefore need not be repeated.

A read only memory ("ROM") 83 provides the instructions or program for CPU 47 which defines the operation described above. This program also defines the initialization and mode of operation of stenographic recorder 11. ROM 83 is accessed much the same way RAM 37 is accessed, using ROM select line 85 from address decoder 81.

Additionally, although not shown, RAM 37 can be backed-up with batteries, providing a relatively permanent storage of the record for later retrieval. Otherwise, stenographic recorder 11 can service a disk drive system (not shown) which could either operate in parallel with RAM 37 but at a lower priority in the servicing scheme, or completely replace RAM 37. With either scenario, the disk drive system would create the permanent storage on a diskette.

As a final matter, while in the prioritizing wait-mode, CPU 47 can evaluate the backlog of the devices which are being serviced and read the status of a severely back-logged device to identify a problem. Warning messages can then be sounded or displayed to the court reporter. This might also be accomplished by using additional interrupt lines signaling malfunctions.

Figure 3:
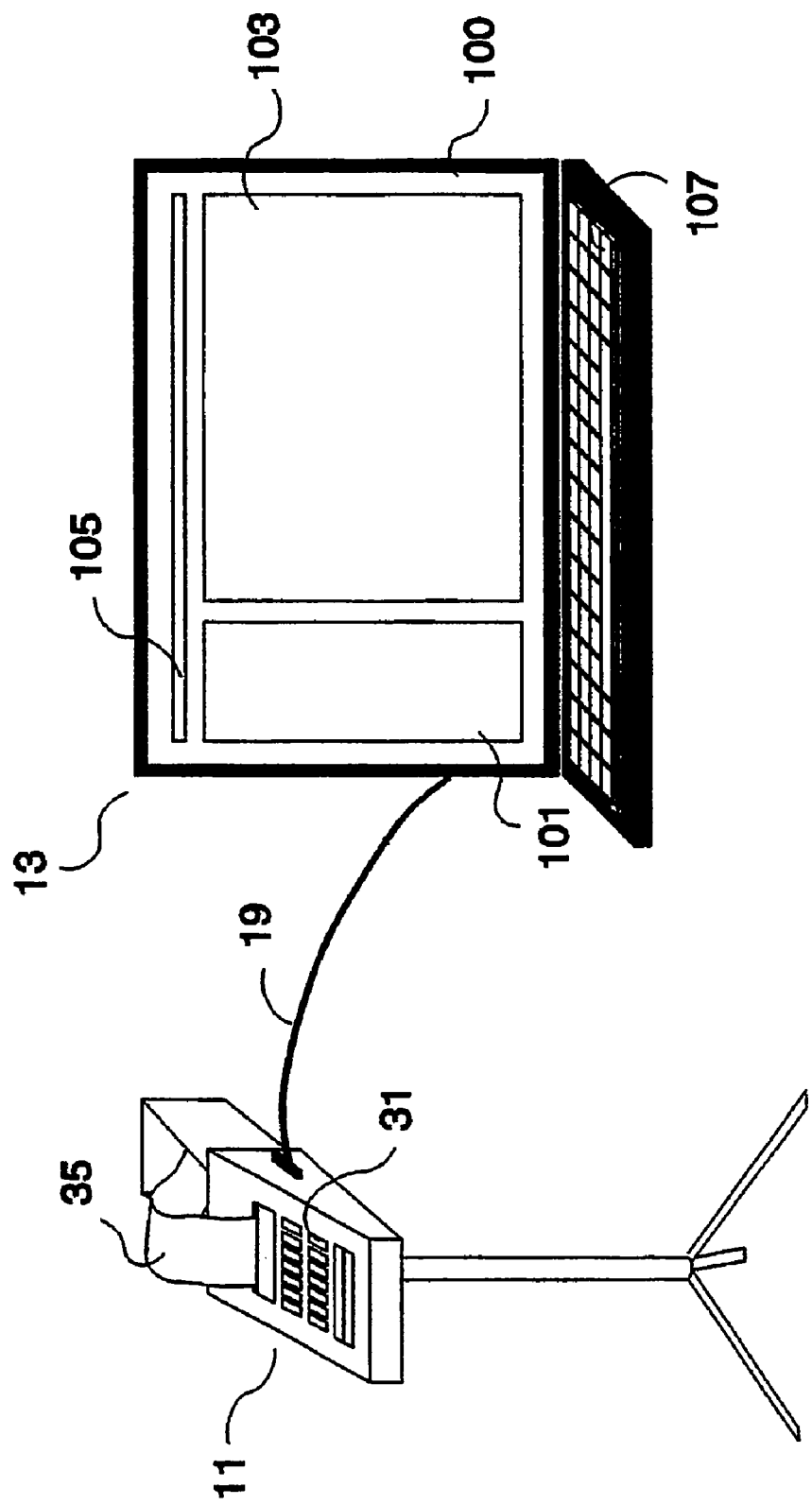
FIG. 3 is a detailed view of the interconnection of the stenographic recorder and CAT system.

FIG. 3 is a detailed view of the interconnection of stenographic recorder 11 and CAT system 13. As previous described, in response to the court reporter stroking keyboard 31, recorder 11 creates a key-stroke code and transmits this to the CAT system 13 (the reporter's terminal) along communication link 19. Key-stroke codes received are displayed in two different formats on a screen 100 of CAT system 13. In a tape window 101 which is shaped and sized much like paper tape 35, alphabetic representations for received key-stroke codes are displayed in a line by line fashion wherein each key-stroke code is represented on a single line. Tape window 101 thus provides an electronic version of a paper tape which is generally in the format familiar to a court reporter.

Screen 100 also includes a transcription window 103 which displays the alphabetic and numeric text representative of the spoken words, i.e., displays the transcribed version of the key-stroke codes received from recorder 11. Through user selection, the windows 101 and 103 can be configured to update the screen 100 upon complete transcription of each: 1) word; 2) sentence; 3) Q & A; or 4) Q or A. The display can also be chosen to operate in either scrolling or paging fashion. For example, with a preferred display selection, the transcription window 103 will only display the current Q & A as it is developed on a sentence by sentence basis. After completing the transcription of the first sentence of a new question, the CAT system 13 clears the currently displayed Q & A (the old Q & A) from the window 103, and displays the transcribed alphabetic and numeric text of the first sentence of the new question. As each additional sentence of the new Q & A is received and transcribed, it too is added to the window 103. After fully transcribing the new Q & A, window 103 holds the display of that new Q & A until the end of the first sentence of the next Q & A; upon which, this cycle repeats.

To set up the mode of updating the windows or to access any of a variety of other CAT system 13 commands, the screen 100 also includes a command line 105. In one embodiment, the command line 105 lists several one-word commands displayed horizontally in a single line of text. The commands listed by the command line 105 can be selected directly using a mouse, pen, fingertip or other input device (none of which are shown) or indirectly by simultaneous pressing the "alt" key and the first letter of the desired command on the keyboard 107. Any other mode or method of command selection involving, for example, button bars, pull-down menuing, or icons might also be used.

As previously stated, a court reporter strokes the stenographic recorder 11 in response to the spoken word. Generally, a given word may demand either a single stroke or multiple strokes based on the complexity of its phonetic composition. Upon completing the strokes necessary for a given word, the court reporter immediately begins stroking the next word. No space bar or other word separator is stroked between words. As a result, all of the strokes run together. At the end of a sentence, the court reporter does stroke recorder 11, however. The CAT system 13 operates on this sequence of key-strokes to determine the beginning and end of each word.

Providing the foundation of the transcription process, the court reporter uses a personalized cross-reference library which lists the readable text of every word that the court reporter has translated to date. Each of these words are associated with the corresponding stenographic key-stroke or sequence of key-strokes that represents that word. This cross-reference library can be displayed in a visual manner, but is stored in binary tree structure for efficient searching.

Upon receiving the first key-stroke code of the sentence, CAT system 13 begins transcription. This first code is compared to all of the possible first stroke codes within the court reporter's cross-reference library. If a complete cross-referenced word is found, CAT system 13 preliminarily treats this as the entire word. Then, upon receiving the second key-stroke code in the sentence, CAT system 13 treats this second key-stroke code as the beginning of another word and looks again to all of the possible first stroke codes within the library. If that code is not found, CAT system 13 must back-track. The first and second codes are combined and are then compared to all of the possible first and second stroke codes within the library. If a complete cross-referenced word is found, CAT system 13 replaces the shorter, single stroke word with this new, two stroke word, and preliminarily treats this as the entire first word. Next, a third code is received and is similarly treated as the beginning of another word, and the cycle repeats.

By the end of the sentence, CAT system 13 provides the best transcription possible. Key-strokes that still remain untranscribed at that point are translated using a phoneme library into readable phoneme representations of those key-strokes to aid both the court reporter and, more importantly, those lay-persons down-line. By pronouncing these phonemes, the lay-person might identify the actual word or words which the cross-reference library did not contain. Substituting the phoneme representation with the actual word or words causes the cross-reference library to be updated.

Once fully transcribed using the cross-reference and phoneme libraries, the entire sentence is communicated down-line to attorney terminals 15 and 16 via communication links 21 and 20, respectively.

Figure 4A:
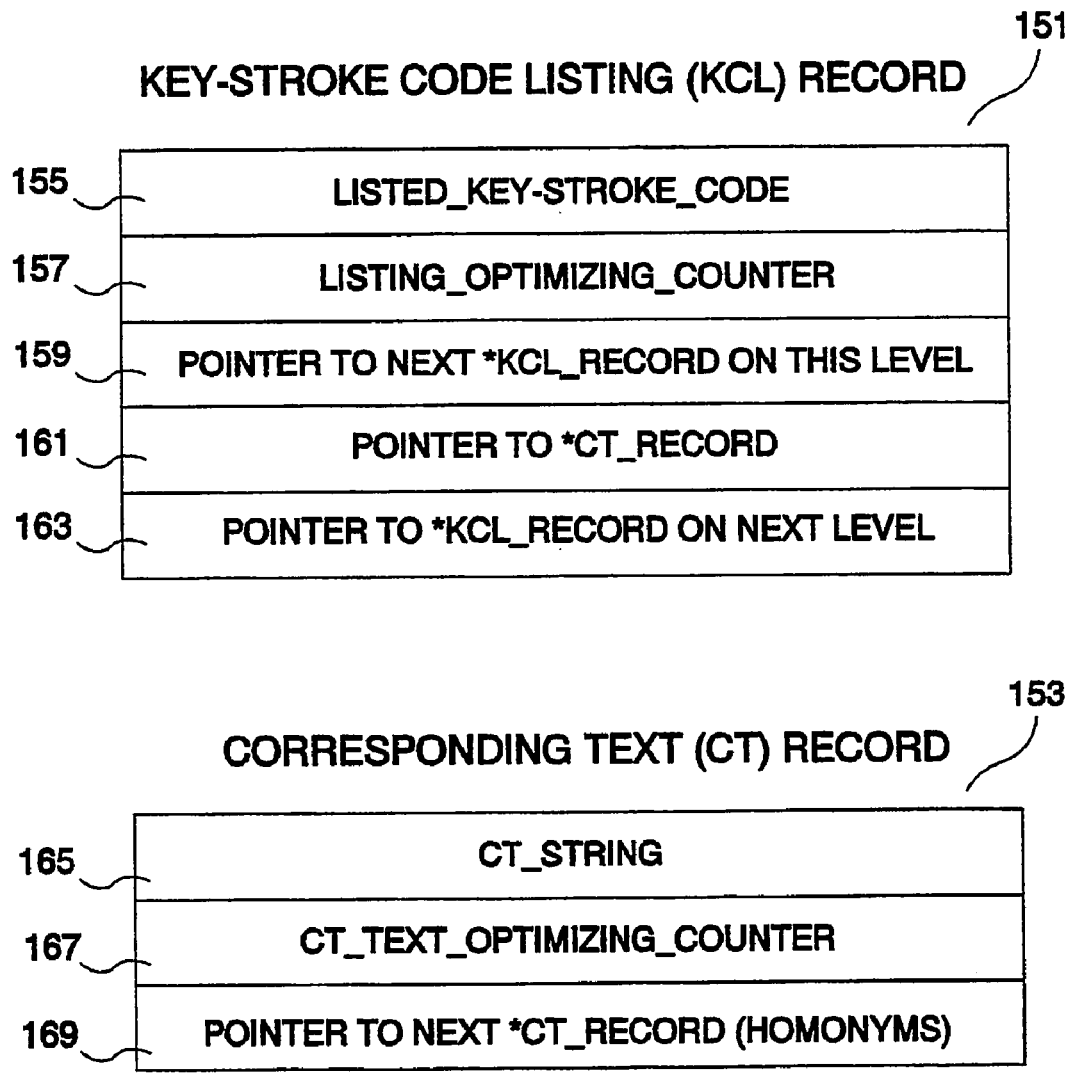
FIG. 4a is a diagram representing the association of data fields into a record which is used as a basis for the overall data structure for transcription according to the present invention.

More specifically, FIG. 4a is a diagram representing the association of data fields into a record which is used as a basis for the overall binary tree, data structure used in transcription according to the present invention. In particular, CAT system 13 utilizes a linked-list arrangement of two types of data records: a key-stroke code listing (KCL) record 151 and a corresponding text (CT) record 153. These two types of records provide the storage structure for the court reporter's personalized cross-referencing library.

Basically, CAT system 13 uses records 151 and 153 to associate each individual key-stroke code with as many subsequent key-stroke codes to represent a given transcribed word. KCL record 151 associates: 1) a listed key-stroke code (LKC) field 155, for storing a specific key-stroke code; 2) a listing optimizing counter (LOC) field 157, for storing a count used for optimizing future searches; 3) a first KCL.sub.— record pointer field 159, for storing a pointer to the next KCL record on this level; 4) a CT record pointer field 161, for storing a pointer to an associated CT record; and 5) a second KCL.sub.—record pointer field 163, for storing a pointer to a corresponding KCL.sub.—record at the next listing level down. Similarly, CT record 153 associates: 1) a CT string field 165, for storing a string of text; 2) a text optimizing counter (TOC) field 167, for storing an additional count used for optimizing transcription; and 3) a CT record homonym pointer field 169, for storing a pointer to another CT record containing a homonym to the contents of CT string field 165.

Figure 4B:
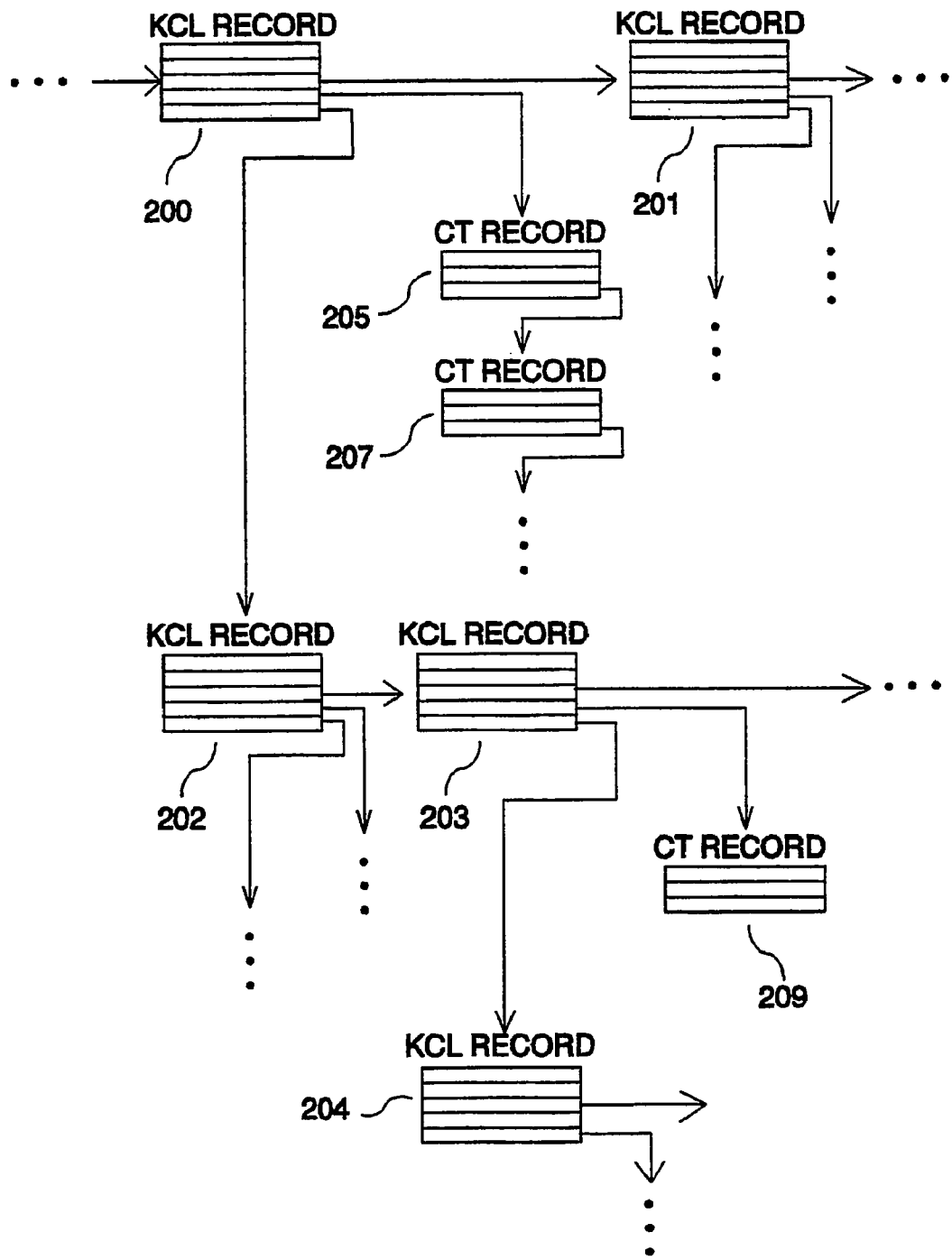
FIG. 4b is a detailed diagram representing the overall data structure used by the CAT system in transcription.

FIG. 4b is a detailed diagram representing a portion of the overall binary, linked-list data structure used by CAT system 13 in transcription. KCL records 200, 201 and all KCL records (not shown) directly to the right and left of records 200, 201 constitute a first listing level. This first listing level is no more than a linked-list of the each beginning stroke in the stenographic representation of the words held in the court reporter's library. Upon receiving the first code of a sentence, that code is compared with each code stored in each KCL record on the first listing level. If, for example, the received code does not match the stored code in KCL record 200, KCL record 200 points to the next KCL record 201 for a similar comparison to the code stored therein. In this manner, by stepping through the first listing level, a matching KCL record can be found.

Assuming that the code stored in KCL record 200 does match the first key-stroke code received, the associated CT records 205 and 207 can be accessed to retrieve readable cross-referenced text. KCL record 200 can also be used as a back-tracking point. If the word transcribed requires two key-strokes, KCL record 200 points to the second listing level. This second listing level is specifically associated with KCL record 200 and begins with KCL records 202 and 203 followed by all KCL type records (not shown) to the right of record 203. Any second code received which follows a first code which matches that stored in KCL record 200 is compared to the codes stored in the KCL records on the second listing level. KCL record 204 represents yet a third listing level under the key-stroke sequence stored in record 200 and 203, and so on. CT records may or may not be associated with a given KCL record. KCL record 202 exemplifies such a situation. Additionally, only a single CT record is generally associated with a single KCL record, such as is shown with KCL record 203 and CT record 209. Only when homonyms exist will there be multiple CT record association as shown with KCL record 200 and CT records 205 and 207.

Particularly, upon receiving a first key-stroke code from stenographic recorder 11, CAT system 13 begins a transcription expedition by parsing through a first listing level in an attempt to find a matching KCL record. If a matching KCL record is found which has an associated CT record transcription, CAT system 13 decides there is a preliminary transcription and treats the second (next) code received as the beginning of a new word, parsing the first listing level for a matching KCL record.

If a matching KCL record is found for first code received yet without an associated CT record transcription, the second code received is compared for a matching KCL record at the second listing level, if a second level beneath the matching KCL record on the first level exists. If a match is found at the second listing level with an associated CT record transcription, the third key-stroke code is treated as the beginning of a new word, and parsing at the first listing level repeats.

If after a match with associated transcription text a key-stroke yields a dead end, back-tracking must occur. The requires picking up where the last successful parsing expedition left off, searching deeper listing levels to see if what had been considered an entire word is really only a portion thereof. If a match is found with an associated CT record transcription, that transcription at that deeper listing level is stored, and the next key-stroke code received is treated as the beginning of a word and the cycle repeats.

With each successive, unsuccessful parsing round, the previously described transcription process becomes more and more complex with many parallel and nested transcription pathways being considered. If available, the first completely transcribed sentence found is communicated to attorney terminals 15 and 16.

Figure 5A:
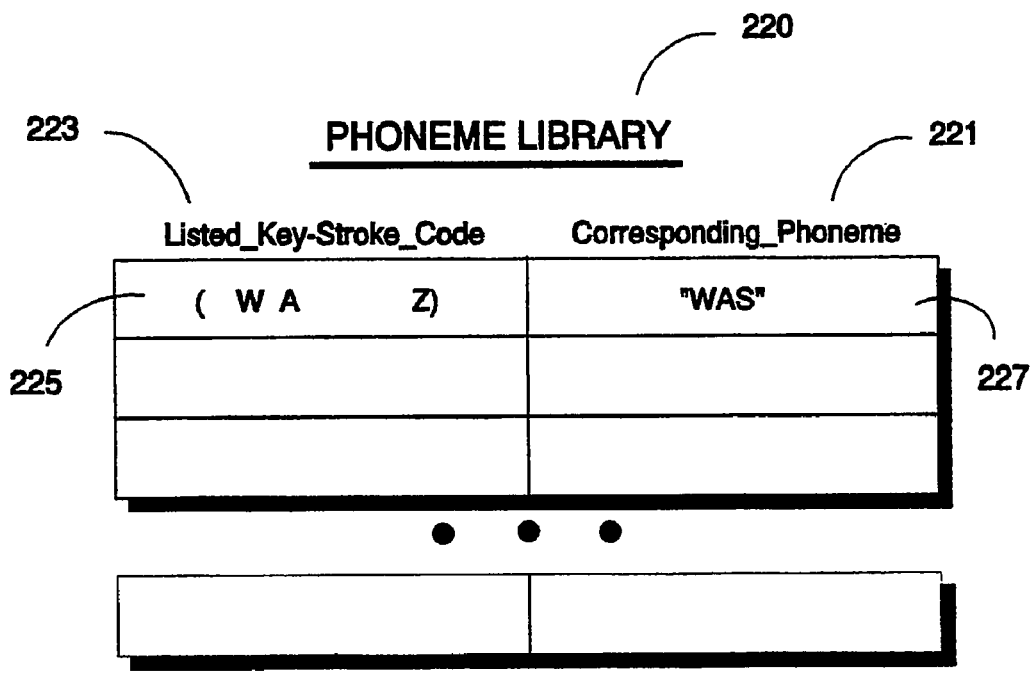
FIG. 5a is a diagram representing the phoneme library used in the present invention wherein substitutions of readable phoneme text is found for untranslated key-strokes.

If a completely transcribed sentence is unavailable, a second phase of transcription, the phoneme transcription phase, is invoked. In this phase, as illustrated by FIG. 5a, each untranscribed key-stroke is cross referenced into a phoneme replacement table or phoneme library 220 to obtain readable phoneme text. Specifically, the CAT system 13 parses through a series of listed key-stroke codes held in a listed.sub.—keystroke.sub.—code field 223 of the phoneme library 220 to locate the key-stroke code entry which corresponds to the untranscribed key-stroke code. Once located, the CAT system 13 extracts the readable phoneme text stored in a corresponding.sub.—phoneme field 221 of the phoneme library 220. Thereafter, extracted text is substituted for the untranscribed key-stroke in the sentence. Once all of the untranscribed key-strokes of the sentence have been replaced with corresponding phoneme text, the sentence is communicated down-line to the attorney terminals. For example, if the CAT system 13 receives a key-stroke code representing the key-stroke "W A Z" for which no counterpart exists in the cross-reference library, the CAT system 13 parses the listed.sub.—key-stroke.sub.—code fields 223 and locates the specific entry in a field 225. The corresponding readable phoneme text entry "was" in a field 227 is then extracted and substituted for the untranscribed key-stroke code in the sentence.

In addition, if homonyms are found, signifying multiple CT record association, they are displayed within parenthesis. For example, the homonyms "their", "there" and "they're" ( ) in the question "Were you there?" would be displayed as:

Q. Were you (there.vertline.their.vertline.they're)?

Although readable, to correct such common homonym transcription problems, another level of transcription is contemplated using so called "artificial intelligence" techniques for determining the correct word grammatically in the context of the given sentence.

As a final matter associated with the data structure, optimizing counters are placed in each record so as to provide optimization of the overall structure. Each time a record is used in the final translated sentence, the associated optimizing counters are incremented. At the end of a deposition, the court reporter can run an optimizing routine which sorts records in each linked list based on the count in the optimizing counters. In this way, the most common matching KCL records are encountered first, speeding up the parsing response time. Similarly, the most common homonyms will appear first in the parenthesis.

Referring back to FIG. 1, CAT system 13 communicates a sentence down-line to terminals 15,16,17,18 when that sentence has been fully transcribed. Full transcription takes place whenever CAT system 13 receives an end of sentence key-stroke code ("EOS") from stenographic recorder 11. If, however, while in mid-sentence, the witness pauses to think, an EOS will not be received. To satisfy an attorney who wants to take this opportunity to review what has been stated thus far, an artificial EOS can be generated. An artificial EOS is generated if either: 1) the pause between the court reporter's key-strokes exceeds a preset time limit (programmable from zero to one hundred and twenty seconds); or 2) an attorney down-line presses the space bar on terminal 15, 16, 17 or 18 indicating via the corresponding communication links 20,21, 22,23 the desire to display what has been received thus far. In response to an artificial EOS, CAT system 13 completes the translation as if an EOS has been received, attaches an artificial EOS to the end, and sends the transcribed "partial" sentence down-line. Thereafter, if the EOS is the very next key-stroke received, CAT system 13 merely communicates an EOS down-line to replace the artificial EOS. Alternatively, if further non-EOS key-strokes are received before receiving an EOS, CAT system 13 completes the transcription of the entire sentence with the EOS and sends it down-line. Terminals 15,16,17,18 over-write the "partial" sentence with the complete sentence received. In the alternative, terminals 15,16, 17,18 might instead merely display partial sentences, only writing full sentences to file.

Depositions involving participants in two or more languages are also contemplated by the present invention. In a first embodiment, the transcription process operates as previously described by providing a word for word transcription of the spoken question in a first language. Each of these words are then cross-referenced into a second language table to generate a sentence in a second language. Although the use of the second language table can be assigned to each attorney terminal down-line, in a preferred mode, the CAT system 13 performs the task. Once translated, the CAT system 13 transmits the second language sentence down-line to viewing participants who understand that second language. By using additional language tables, the CAT system 13 can provide translations for as many languages as is needed.

If the CAT system 13 performs the translation task, the CAT system 13 also manages the specific down-line routing of first and second language sentences, automatically. To accommodate automatic routing, all participants are required to identify their viewing language and their role in the deposition upon logging in to the system 13. The CAT system 13 stores the identified information in a log-in list. By referencing the log-in list, the CAT system 13 automatically configures itself so as to provide each participant with a translation in their appropriate language.

Figure 5B:
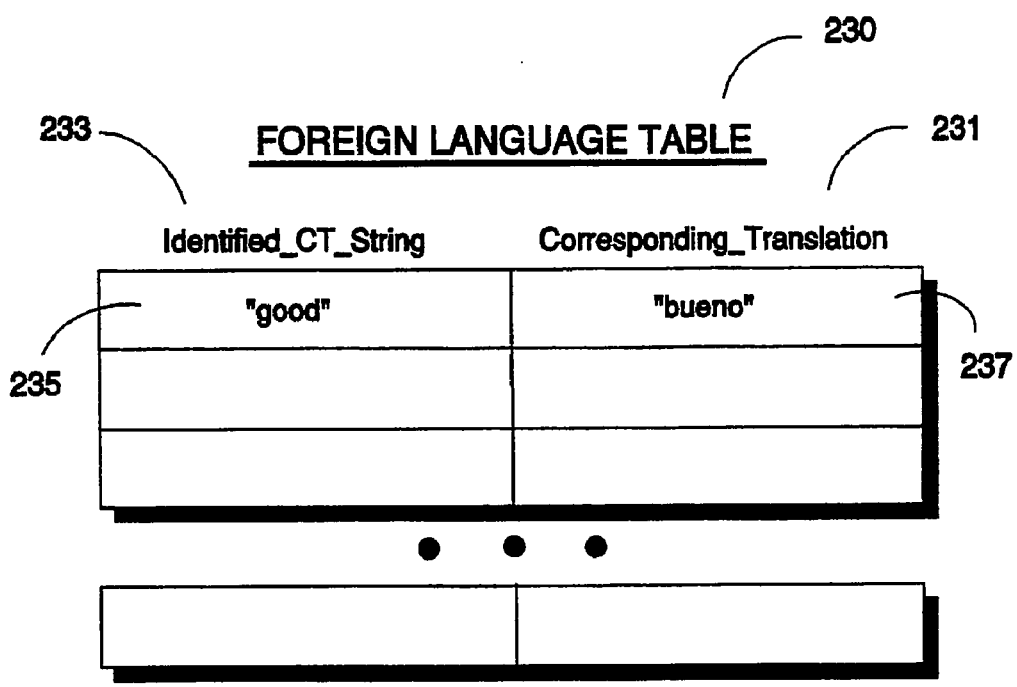
FIG. 5b is an exemplary diagram of a foreign language table which is used to cross-reference text of a first language that corresponds to translated words of a first language.

An exemplary second or foreign language table 231 is illustrated in FIG. 5b. Using the language table 231, the CAT system 13 parses the text entries of a first language in a series of identified.sub.—CT.sub.—String fields 233 to locate the transcribed text of a word in a first language. Once located, the text of a second language is extracted from a corresponding.sub.—translation field 231 and placed into a second language sentence. Each transcribed word in the first language undergoes this process so that a second language sentence can be fully constructed. Thereafter, both the first and second language sentences are transmitted down-line to the appropriate participant. For example, the word "good" located in a field 235 in a first language, English, would be directly substituted by the word "bueno" of a second language, Spanish, contained in field 237. Although translations would not always be exact because of word context, the use of a human translator could be minimized. Moreover, as a supplement to the language table 230, word context analysis might also be implemented to increase the accuracy of the translations.

If the down-line participants that speak during the deposition all share a common language, the court reporter need only understand the common language and provide a cross-reference library and a phoneme library for that language. Alternate language translations for non-speaking, down-line participants, are provided using as many different foreign language tables as needed, as described above. Routing and language information is retrieved from the log-in list.

If, however, the down-line participants that speak during the deposition share two or more languages, in a preferred embodiment, a multi-lingual court reporter provides a cross-reference library, and phoneme library for each of the languages being spoken. Additionally, for each spoken language, language tables providing translation into each of the multiple languages are also necessary. During the translation process, when the multi-lingual court reporter indicates the beginning of a question or answer, or otherwise identifies the speaker, the CAT system 13 automatically selects the appropriate cross-reference and phoneme libraries to transcribe the spoken language, then accesses the appropriate foreign language tables to construct sentence translations. The resulting translations are automatically routed down-line. The CAT system 13 performs the automatic selection of libraries and tables and routing with reference to the entries in the log-in list.

Although the use of multiple phoneme libraries is preferred in a multiple language deposition, they may be completely ignored. Otherwise, when attempting to translate phoneme text into a second language, the phoneme text should be replaced by equivalent phoneme text in the second language. Therefore, pronunciation of the spoken word would sound the same in either language. Because with phoneme text the actual transcription of a word is unknown, a second language translation cannot be found. Therefore, as a substitute, a pronunciation for each of the participants in the phonemes of their language which sounds like the spoken word in the first language is provided.

Figure 6A:
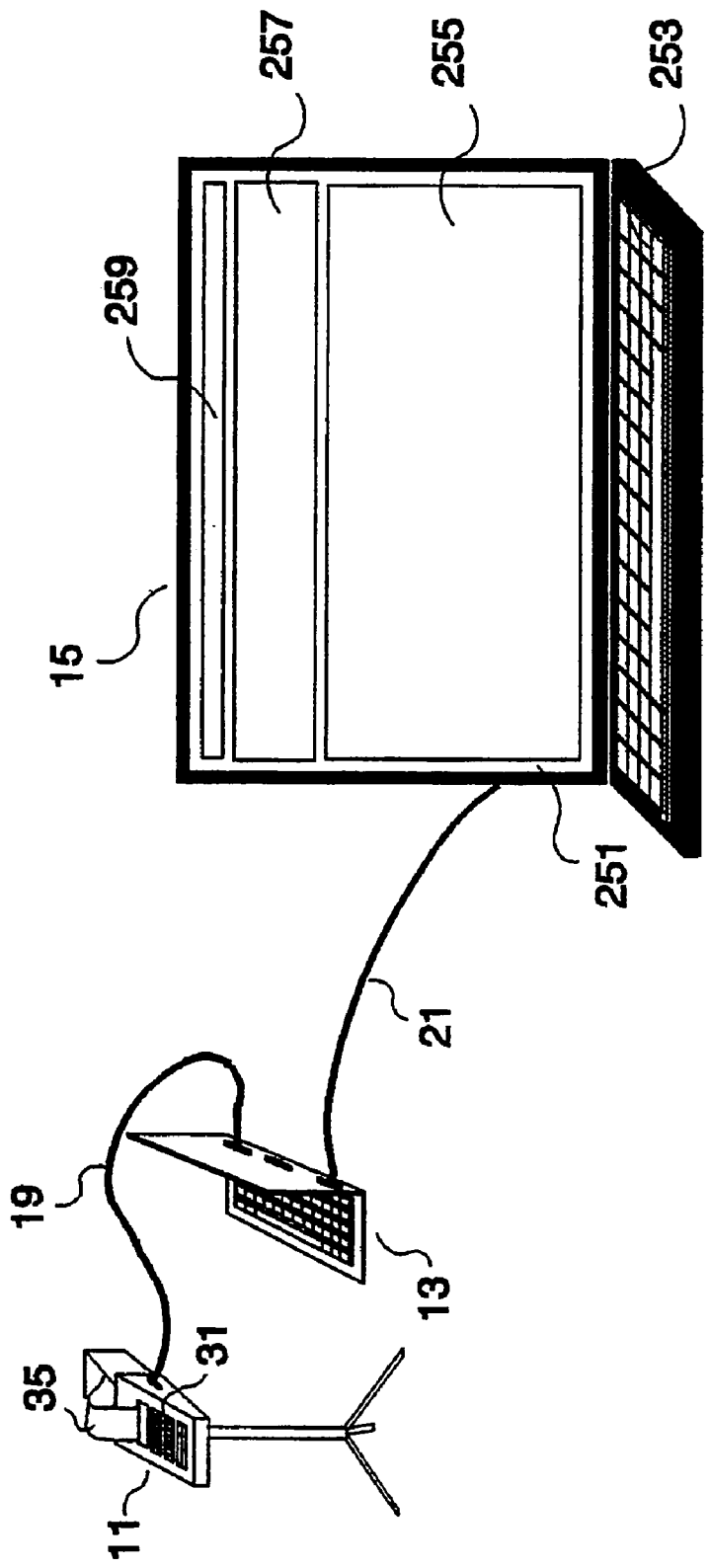
FIG. 6a is a perspective view of the examining attorney terminal and its interconnection to the CAT system and stenographic recorder.

Referring to FIG. 6a, examining attorney terminal 15 includes a screen 251 and a keyboard 253. Screen 251 is split into a transcription window 255 and a communication window 257, having a common command line 259. The display of window 255 is very similar to that of window 103 in CAT System 13 (FIG. 3), displaying the transcribed text and having the same setup response choices. This transcribed text is received by terminal 15 from CAT System 13 in coded form along communication link 21 in a sentence by sentence fashion as described above.

Even though transcription is received on a sentence by sentence unit basis, in the preferred mode of response, the sentences units received are not displayed in window 255 until an entire question or responding entire answer has been received. Three indicators are used to signify the end of a question (EOQ) or end of an answer (EOA): 1) a court reporter's key-stroke signifying the beginning of an answer, clearly indicating an EOQ and visa versa; 2) the expiration of a preset delay (programmable from zero to one hundred and twenty seconds) since the last received sentence, providing an artificial EOQ or EOA; and 3) the examining attorney pressing a space bar 261, indicating a desire to see what has been received thus far and providing an artificial EOQ or EOA. Because the second and third indicators only signify that a question or an answer has possibly ended, they are updated upon receiving a true EOQ or EOA.

Figure 6B:
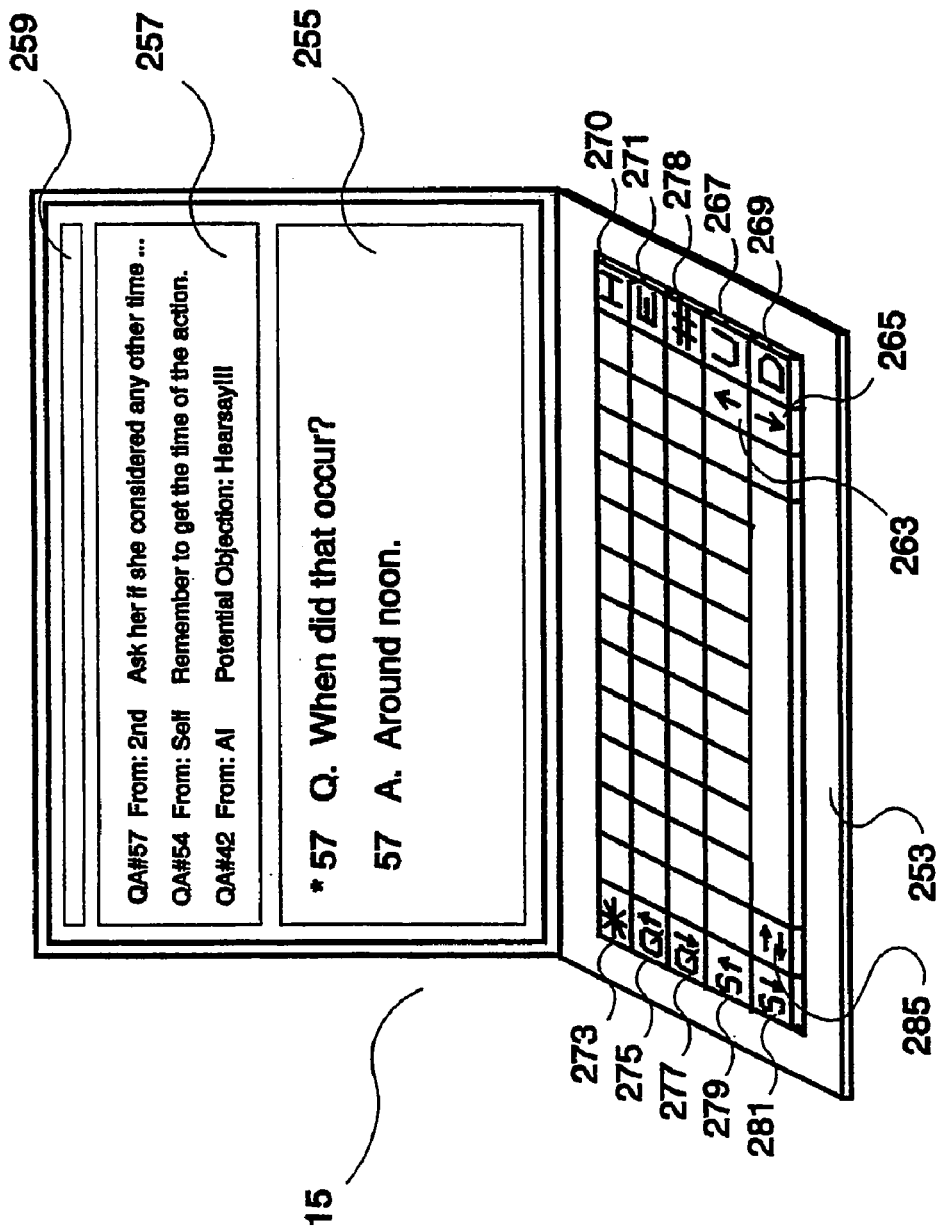
FIG. 6b is a perspective view of the examining attorney terminal's which provides further detail for both the display and keyboard.

As illustrated in FIG. 6b, the question begins in window 255 with the symbol "Q" followed by the question. For example, FIG. 6b shows the display:
Q. When did that occur?

Afterwards, upon receiving the entire transcribed answer (signified by an EOA or an artificial EOA), the answer appears in window 255 directly below the question. The answer appears on window 255 following the symbol "A". For example, FIG. 6b shows the answer:
A. Around noon.

If the remaining room in window 255 is such that the Q & A cannot be simultaneously displayed, the answer is displayed at the bottom-most portion of window 255 while the remaining room is allocated to the end of the question.

Each Q & A remains displayed until the next transcribed question is received in its entirety. This is defined by either the receipt of an EOQ or an artificial EOQ. Thereupon, the last Q & A is cleared from window 255 and the entire next question is presented at one time, and the Q & A cycle repeats.

By permitting only the display of one Q & A unit at a time, transcription window 255 remains uncluttered, and the examining attorney can easily focus on the pending question and/or the last answer. Thus, for each successive Q & A unit, window 255 is cleared and then displays the full, transcribed text of the question followed by its corresponding answer.

In a preferred mode, each Q & A unit is associated with a different number so as to provide a reference to specific Q & A's. The numbers are given in consecutive order for ease of reference. As shown in FIG. 6b, the Q & A displayed is associated with the number 57, signifying that the displayed Q & A is the 57th Q & A received. In its entirety, window 255 shows:
*57 Q. When did that occur?
57 A. Around noon.

Keyboard 253 includes an up arrow key 263 and a down arrow key 265 for scrolling through the Q & A's. For example, stroking the up arrow key 263 causes scrolling upwardly in a line-by-line fashion bringing the previous Q & A into display on window 255. For faster movement between Q & A's, keyboard 253 provides a page up key 267 and a page down key 269. In response to a single stroke, keys 267 or 269 cause paging between entire Q & A's. In addition, keyboard 253 includes a "home" key 270 and an "end" key 271. No matter which previous Q & A is currently being displayed, actuation of end key 271 causes window 255 to display either the last full Q & A or, if no answer has been completed, to the last pending Q. Similarly, home key 270 causes window 255 to display the first Q & A of the proceeding.

Keyboard 253 also includes a "mark" key 273 which permits any Q & A to be marked for later reference. The marked Q & A is indicated in the window by an asterisk symbol appearing on the screen to the left of the Q symbol as shown in FIG. 6b. Associated therewith, keyboard 253 also includes a "quick-up" key 275 and a "quick-down" key 277 which permit scrolling only through the asterisked marked questions.

In particular, if an important answer or definition has been given by the witness, the examining attorney can mark the Q & A with an asterisk. Whenever the attorney wishes to refer back up to that answer, he or she may merely press quick-up key 275 to recall to the display window 255 the marked questioned with its answer. The attorney may also desire to refer back up to a Q & A marked several marked Q & A's ago. To accomplish this, successive strokes to quick-up key 275 pages backward through previously marked Q & A's. Although stroking end key 271 returns the display in window 255 to the pending question, the examining attorney may desire to sequentially page down through the marked Q & A's as they occurred. The quick-down key 277 provides this ability. In addition, marked Q & A's can be referred to after the deposition in preparation for the next day's deposition. As understood, pertinent questions may also be marked at a time outside of the deposition, for example, later that evening at the hotel room before the next day's deposition.

Accessing a specific Q & A can be achieved through the associated number assigned to that Q & A. By pressing a "number" key 278 followed by the number previously associated with a specific Q & A, terminal 15 locates and displays that Q & A in window 255. A specific Q & A can also be located through a lexical scanning capability accessible through a scan-up key 279 and a scan-down key 281. For example, by pressing scan up key 279 followed by a lexical searching template, attorney terminal 15 scans backward through the previous Q & A's in an attempt to find text matching the lexical template. If a match is found, that Q & A is displayed on window 255, else a "no match found" message is received. Afterwards, stroking scan-up key 279 again pulls up the most recently used lexical template. By merely stroking scan-up key 279 without modification to the template continues the search further upward through previous Q & A's. Scan down key 281 works in a similar manner but scanning in the opposite direction.

In general, the lexical template format and features are similar to those provided in legal searching databases familiar to most attorneys. These templates can be constructed using logical operators, wild card characters, quotes, parenthesis and brackets with specific text to be located. The lexical template ordinarily must be satisfied by a single Q & A. To over-ride this "default" condition, a delimiter must be used. For example, placing a "/A" or a "/Q" delimiter within the template, directs attorney terminal 15 to satisfy that template, or portion thereof, entirely within a single answer or a single question, respectively. A "/QA2" delimiter expands the search to within two consecutive Q & A's; while a "/QA3" corresponds to within three consecutive Q & A's, and so on. Similarly, a delimiter of "/A3" or a delimiter of "/Q5" respectively require satisfaction of the lexical template to within three consecutive answers or within five consecutive questions. Delimiters "/W4", "W5Q", or "W3A" require the respective satisfaction within: 1) four consecutive words in either a single Q or A; 2) five consecutive words in a question only; or 3) three consecutive words in an answer only.

In addition to searching only the current transcript, lexical searching can also be applied to all other evidence in the lawsuit. The terminal 15 permits either locally or remotely stored transcripts recorded at previous hearings or depositions to be selected and searched through the command line 259. Similarly, all other case evidence such as the pleadings documents or documents produced through discovery may be scanned-in, converted to text using character recognition software, and made available for the lexical searching. Once located through a search, the scanned-in image can be retrieved and displayed or printed for use as an exhibit at the ongoing deposition.

Remotely located legal databases such as Lexis® or Westlaw® can also be accessed and searched through the command line 259 during the deposition. Searching other sources may be used to identify discrepancies in the witness's current testimony, or to help clarify the law in an unexpected area so that appropriate questioning can be directed.

Although boolean logic is used for formulating lexical search requests, a natural language front end is also contemplated. The attorney terminals could provide for user preference, invoking the boolean logic or natural language front end upon request. The lexical formulation for a search is identical whether searching any of the case evidence or legal databases, thus providing uniformity of searching.

The specific placement of the various keys shown on keyboard 253 is not critical. In fact, the illustrative placement in FIG. 6b is merely set forth for ease of explanation. Additionally, the functionality of these keys may be accessed directly from the command line 259 as explained above.

Pressing a tab key 285, or through direct selection with a mouse, pen or finger-tip, causes toggling between transcription window 255 and communication window 257. The communication window 257 provides a visual display in either a stack mode and an edit mode. As illustrated, in the stack mode, communication window 257 displays the first line of each communication received. These communications originate from three sources: 1) the examining attorney's keyboard 253—personal notes "From: Self" or messages "To:" others; 2) the examining attorney terminal 15—through artificial intelligence ("AI") algorithms "From: AI" which convey potential objections or through scheduler messages; and 3) the other terminals on the network such as the associate examining attorney terminal 17—messages "From:" others. While in the stack mode, window 257 can display all of the communications from one source, all sources, or any combination of the three sources.

To fully read any communication, the examining attorney merely selects the desired communication from the stack of messages illustrated in the window 257, causing the window 257 to display of the full text of the communication in an edit mode. Communications can also be created, modified, deleted, copied, printed, or communicated to the other terminals, such as associate examining attorney terminal 17 via the communication window 257.

In this embodiment, one side's message exchange along that side's communication Link cannot be intercepted by the opposing attorney's not only because the communication links are isolated, but also because of the controls placed on the CAT system 13. The CAT system 13 can only consider relaying communications from one side to the other if a specific request therefor is received. Moreover, even if a specific request is received, the CAT system 13 cannot relay communications unless specific permission has been given to receive such communications. In particular, an attorney on one side sends a communication to the CAT system 13 with a specific request that the communication be relayed a recipient on the opposing side. Once received, the CAT system 13 complies to the request only if the recipient on the opposing side grants permission for the relaying. To grant or retract permission, each side sends a message to the CAT system 13, at log-in or at any subsequent time, indicating whether or not requests to relay messages from the other side should be honored. If not, the CAT system 13 responds to each request by sending a do-not-disturb (DND) message to the requesting terminal. If so, the CAT system 13 responds by relaying the message from the sending side's communication link to the receiving side's link.

In either the edit or stack display modes, communication window 257 interfaces with a mouse, keyboard 253 and associated keys in much the same way as does transcription window 255. For example, up and down arrow keys 263 and 265 and page up and down keys 267 and 269 respectively permit scrolling and paging through the stack or text. However, the scan-up and scan-down keys 279 and 281 operate in a slightly different way. In particular, as a default, lexical scanning only parses the currently displayed stack, i.e., the currently selected communication sources. A global command delimiter "/G" overrides the default so that all communications from all sources can be scanned. The following use of delimiters can override the default: a "/M" for messages only; "/N" for notes only; "/AI" for AI objections only; or for combinations of these fields—for example "/MN" for messages and notes only.

The examining attorney may also choose to modify a significance indicator, preferably a fuzzy-logic type slide-bar icon, which causes the attorney terminals to associate a level of priority with each message, note, or other communication received. The significance indicator may default at an average oar middle setting and need not be adjusted. If selected as a set-up option, the significance indicator can be used, along with the age of the communication, to adjust the order of the stack of communications. The significance indicator can also be used to associate a window or window border color with the level of priority the communication carries. When set to a maximum value the significance indicator can also be used to send a flashing message to another terminal, indicating immediate attention is desired. This functionality exists on each of the terminals in the transcription network.

The examining attorney may also type to himself his own notes as the deposition is progressing. These notes may serve useful in that they may be reviewed later that evening in order to prepare for the next day of deposition, or they may be used at a later time during the deposition when a question becomes ripe. Most attorneys take notes during a deposition. Those who type proficiently may take notes with keyboard 253, and those who do not might use pen-based input as described more fully below in relation to FIG. 13.

Alternatively, the examining attorney may type or pen notes into his terminal before the deposition begins. In particular, the attorney terminals 15 and 17 provide an outline mode for hierarchically outlining by subject category and sub-category a series of ordered questions to ask the witness or to act as a reminder as to certain areas of questioning that must be covered during the examination.

Figure 7A:
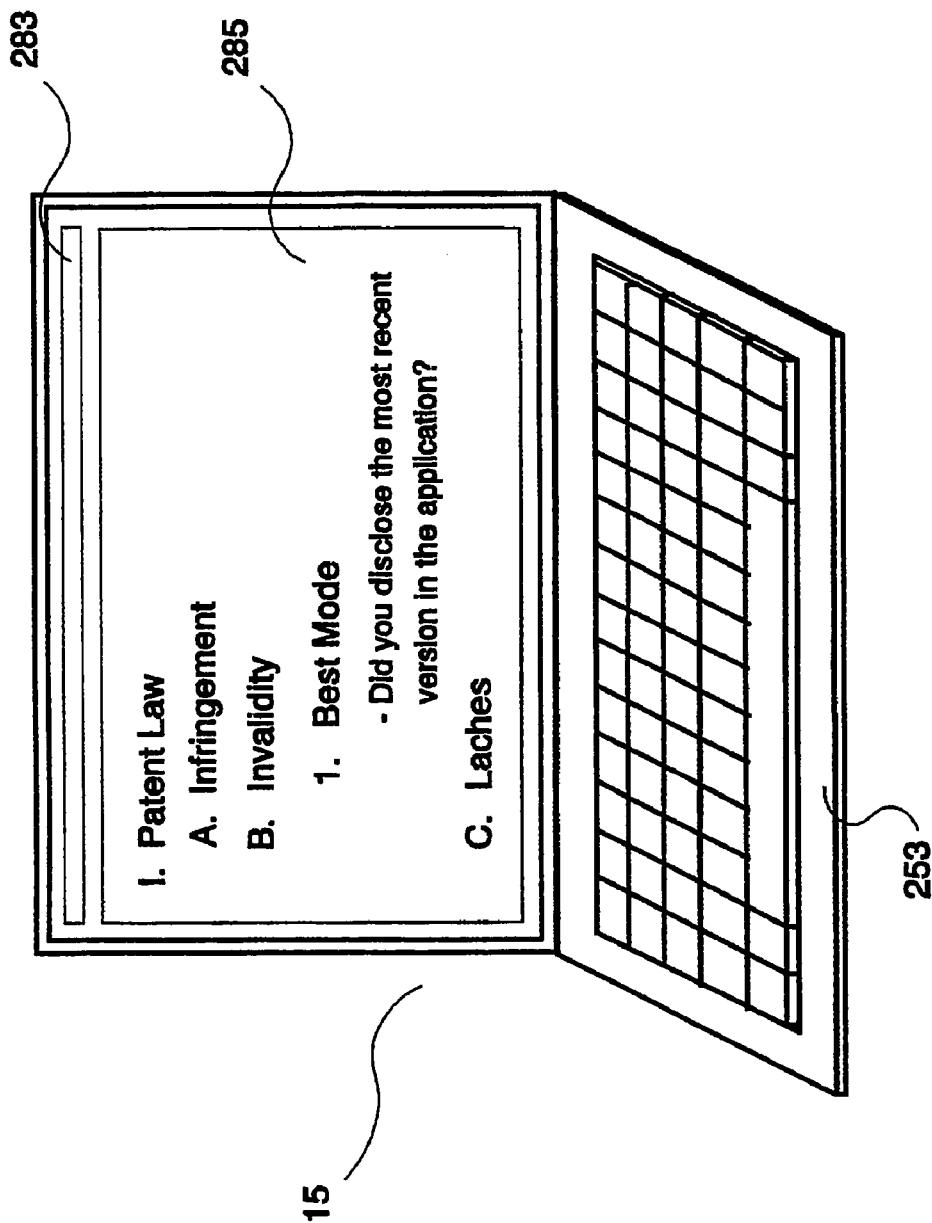
FIG. 7a is a perspective view of the examining attorney terminal displaying the outline mode of the present invention which provides text editing of a case law outline indexing a set of preset messages.

Referring to FIG. 7a, while off-line, upon entering the outline mode, the examining attorney uses the attorney terminal 15 to create a conventional outline of the names of categories and subcategories to be covered at a deposition using an outline window 285. As illustrated, an area of law such as "patent law" is entered as a hierarchical entry point by assigning it a Roman numeral as is in typical outlines. Each subcategory of patent law such as infringement, invalidity, laches, etc., is then entered thereunder. Similarly, the attorney continues to enter sub-subcategories and so on until all of the categories of patent law that need to be discovered are in the outline. Next, the attorney enters questions or notes under the appropriate categories in the outline. For example, under "best mode" the attorney may enter the question: "Did you disclose the most recent version of your invention in the patent application?" After all of the questions (or notes) have been entered, the attorney then estimates the amount of time that should be spent on each category. This time is entered through a command line 283 for use by a scheduler (described below in more detail).

Figure 7B:
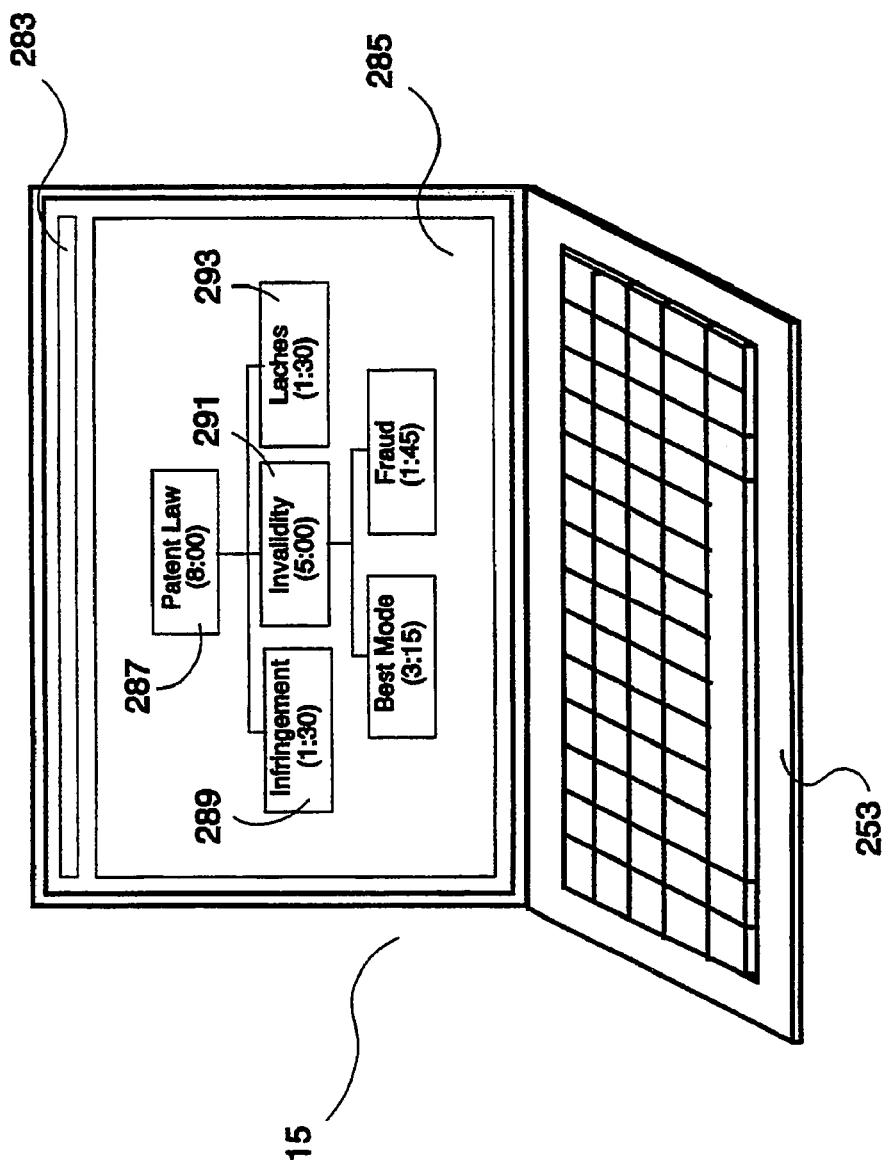
FIG. 7b is a perspective view of the examining attorney terminal displaying a tree-structured outline providing hierarchical display of the categories of law to be investigated during a deposition.

After entering the entire outline, questions and estimated times, the attorney invokes a toggle command on the command line 283 which causes the outline structure to enter the graphical tree-structured display mode illustrated in FIG. 7b. In this mode, the outline window 285 displays the created outline in a tree-structured format. Each category and subcategory can be easily discerned as well as the total estimated time to finish each hierarchical level. For example, in a block 287, the area of law, patent law, can be found to have an estimated time of eight (8:00) hours to complete. This time is comprised of one hour and thirty minutes (1:30) to complete "laches" at a block 289, five hours (5:00) to complete "invalidity" at a block 291, and one hour and thirty minutes (1:30) to complete "willfulness" at a block 293. In the preferred embodiment, the underlying questions or notes associated with each category or sub-category are not displayed in the tree-structured display. Toggling between the standard outline display and the tree-structured display can be repeated until preparation for the deposition is complete.

In addition to generating entire outlines from scratch, standard, reusable outlines pertaining to specific areas of law may be effectively utilized as a default. Once the outline is created, it may be re-used in subsequent depositions by merely adding or deleting questions where applicable.

Pretyped questions are used during the deposition by both the examining and defending attorneys to direct the proceedings. In addition, notes can be added detailing the current state of the law in each subcategory for reference during a deposition.

Referring back to FIG. 6a, while in the outline mode during a deposition, the configuration of windows on screen 251 of the examining attorney's terminal 15 is identical to that described above with one exception. Instead of displaying Q & A's, the window 255 is used for an outline mode display. Particularly, whenever an outline command is selected from the command line 259, the window 255 displays the tree-structured outline illustrated in FIG. 7b. From this outline, the attorney may choose to: 1) toggle to the standard outline, illustrated in FIG. 7a, to update the outline; 2) evaluate and, if necessary, change the time estimates based on the deposition progression; or 3) select a category of questions and notes for immediate use.

By double-clicking the mouse button on the desired category (or through command selection via the command line 259), the pretyped questions and notes relating to the selected category are assembled onto a stack and displayed in the communication window 257 for immediate use. Upon user setup selection, the pretyped communications can be pushed onto the stack or be placed into a new independent stack which is solely displayed on the window 257. With the later selection, an individual stack is constructed for each and every subcategory in the outline.

As with off-line preparation, during the deposition, notes may be modified or added. Similarly, new categories may be added so that existing notes may be placed thereunder. To move an existing note, the note need only be selected via the window 257 and transferred by selecting a category via the window 256.

In an alternate embodiment, color coding is used to aid the identification of areas of remaining inquiry. For example: a grey category name indicates that all of the notes thereunder have been addressed; a yellow category name indicates that all of the notes thereunder need to be addressed; and a blue category name indicates that some of the notes thereunder need to be addressed. Similar color coding can be used for the specific notes. Colors can change automatically, upon detecting that all notes have been used, or manually by the attorney upon exhausting an inquiry without using all the questions or notes.

In addition, the terminals 15 and 17 record the range of the Q & A numbers which occur while within each specific category or subcategory. The range of Q & A's recorded can thereafter be used to aid in the review of areas of inquiry which are scattered throughout a transcript.

Objections to form must be seasonable, therefore timing is of utmost importance. To speed up the objection process, AI software routines analyze the form of each question and the content of the answer during and immediately after translation to provide various potential objections that the examining attorney may want to take into consideration in attempting to achieving good evidentiary form. For example, a search is made on each question for phrases such as "you said" or "you stated" or "you say". If found, the AI routines immediately send a potential objection to the communication windows indicating that the question possibly mischaracterizes the witnesses earlier testimony. In response to the communication, the defending attorney may object, and may also initiate a search for the mischaracterized statement by opening the communication and pressing the scan up key 279. In this way, mischaracterizations may be avoided or corrected. Similarly, for example, answers are analyzed with focus on words such as "said" and "stated" to identify potential hearsay therein. The examining attorney may choose to object or ignore the communication.

Figure 8:
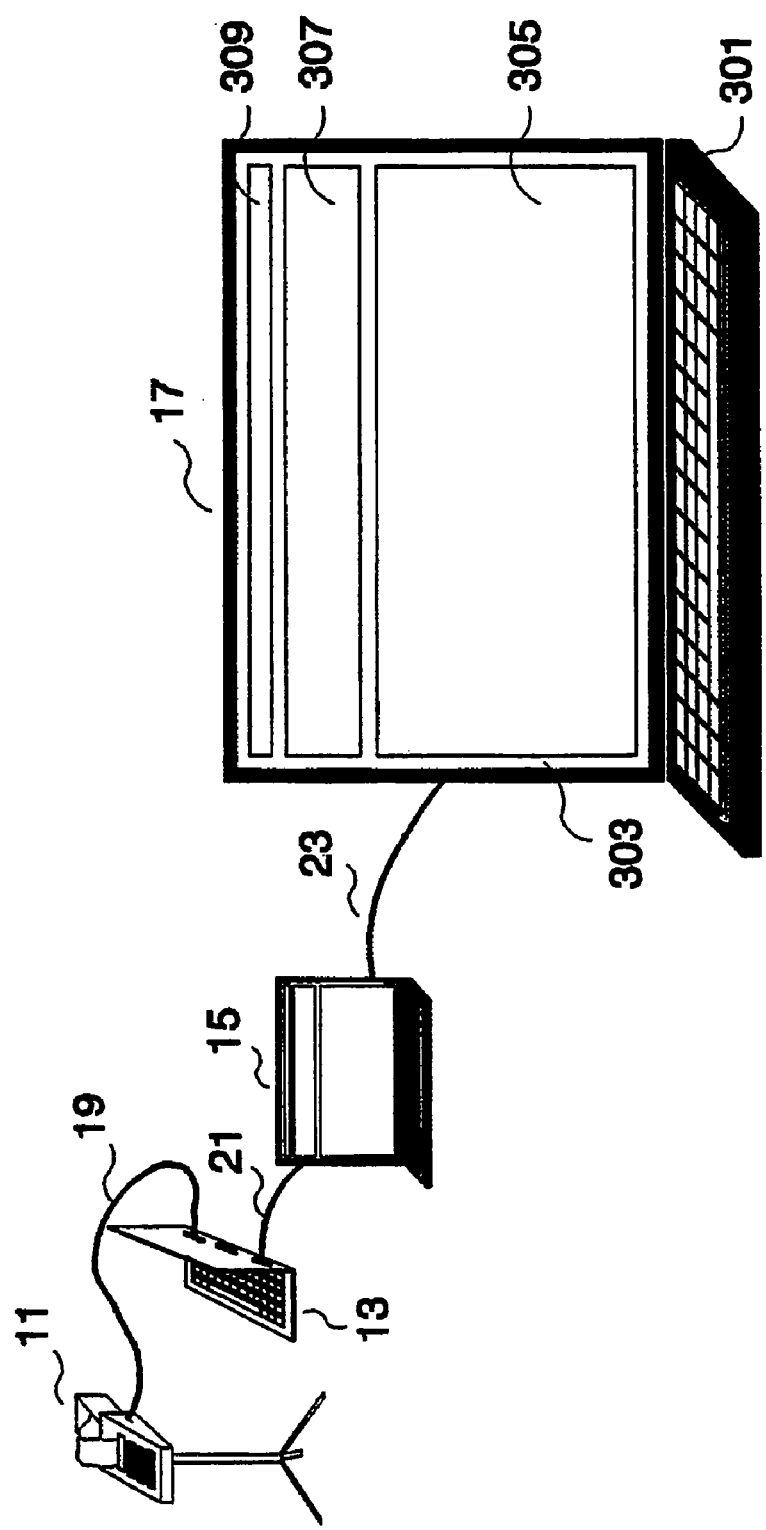
FIG. 8 is a perspective view of the associate examining attorney terminal which provides details in both the display and keyboard and its interconnection to the examining attorney terminal, CAT system and stenographic recorder.

As illustrated in FIG. 8, associate examining attorney terminal 17 includes a keyboard 301 having alphabetical keys arranged in a standard typing keyboard key pattern. As with the examining attorney's terminal 15, the associate examining attorney terminal 17 includes a screen 303 which is split into a transcription window 305 and a communication window 307 which have a common command line 309. While in the deposition mode, the terminal 17 displays the alphabetic and numeric text representing the spoken words in the transcription window 305, and the window 307 provides for input and display of messages, notes, etc. In the outline mode, the window 305 performs the hierarchical outlining functions described more fully above in relation to the terminal 15.

The associate attorney may also send messages to the examining attorney as the deposition is being carried out. The functionality of such communication is identical to that described previously regarding communication in the opposite direction with one enhancement. The associate's terminal 17 provides the capability of viewing, modifying, and sorting the communication currently present on the attorney terminal 15. Such capability allows the associate attorney to help organize the terminal 15, which has added importance for an examining attorney with little computer literacy.

AI objections are always associated with specific questions or answers. Messages may be associated upon selection via the command lines so that the recipient can place the question in context. Notes can be similarly associated. Important messages, notes, or objections can be recorded in a supplemental file by using the annotate command from the command line. Annotating creates a file of annotations which may or may not be associated with a specific Q & A, which may be stored with the transcript for later retrieval and review.

A demeanor marker command also provides for annotating a specific Q & A. Noticing that the witness turns red or begins to stutter, fidget, or raise their voice in response to a specific question, an attorney can select the demeanor command which presents a pretyped list of demeanor indications such as "fidgeting" or those listed which may be immediately associated with the current Q & A and stored as an annotation to the transcript. Similarly, a conferral command can be selected to annotate that the witness and opposing attorney conferred off the record regarding an associated Q & A. Additionally, although not generally useful during the deposition because they may be overheard, voice recorded notes or annotations may also be added by an attorney reviewing the transcript away from the deposition. Such annotations may be selectively displayed or played back via the attorney terminal's command line.

In the communication windows of each terminal, a stack containing a series of common pretyped messages ("common message stack") can be quickly accessed for transmittal. For example, in the communication window 307 of the terminal 17, a series of common messages such as "What was the date, time, year?", "Were there any witnesses to the event?", or "What is his name, address, employer?" can be pretyped and listed in a message stack format in the window 307. The associate attorney need only select the desired pretyped message from the stack and select the send command. Similarly, potential objection messages can be added for quick access to the common message stack in the communication window of the associate defending attorney's terminal 18. The common message stack at each terminal can be customized by editing, adding or deleting messages therefrom.

A time command is also available for the command windows of the attorney terminals.

Executing the time command enables the attorney to identify delay times between the end of a specific question and the beginning of the witness's answer. Similarly, using the time command, witness and opposing attorney conferral time can be recorded. Underlying this command, a system timing routine operates to log event timing in a separate data file which the time command can access for specific requests.

The system timing routine also operates as an alarm clock for scheduling a deposition. Referring back to FIGS. 7a and 7b, using the alarm con, hand while preparing a hierarchical outline for the deposition, the attorney may allocate a projected amount of time for each category or subcategory. The projections can be monitored by the system timing routine, and indicate to the attorney through a system communication that projections are not being held. Specifically, while under a particular category, the system timing routine begins to count down the time allocated to the subcategory as described above. If the attorney completes the category before time runs out, the extra time will be added to a buffer. If instead time runs out, the alarm clock sends a communication to the attorney indicating that the projected time has expired and indicates the buffer status. The buffer is periodically updated by subtracting the time which lapses beyond the projected value. If after receiving the system communication the attorney remains in a category past the projected time period, the alarm clock sends a new system communication every thirty (30) minutes (as a default value).

As the deposition progresses, whenever the attorney enters the tree-structured outline mode, the time value displayed for each category, as illustrated in FIG. 7b, reflects the time remaining in each specific category. The time value for the category currently selected (and its parents in the tree-structure) continually updates so as to display the scheduler's minute by minute count down. Rescheduling or other time value changes are automatically reflected throughout the entire tree-structured display, enabling better time management of the deposition.

When a confidential restriction is placed on specific subject matter of a deposition, the examining attorney often forgets to remove the restriction when the subject has changed. By selecting the alarm clock command and then the subsequently listed confidentiality wake-up command, the terminal 15 automatically sends a system communication every fifteen minutes (can be changed through a set up screen) to remind the examining attorney to clear the restriction from the transcript if possible. In addition, upon selecting a different category or subcategory in the hierarchical outline, a system communication is also immediately transmitted as a reminder. The confidentiality con, land also provides a mechanism for disabling and enabling local network communication from reaching off-site client terminals, unless specifically directed thereto.

In one embodiment of the present invention, translated sentences are communicated from CAT system 13 via serial communication along communication link 21 to terminal 15 and communication link 23 to terminal 17. Communications between terminals 15 and 17 utilize the two independent communication links 21 and 23. In another embodiment, the communication links 21 and 23 are interconnected and function as a single communication link (bus) using a TCP-IP protocol on an ethernet coaxial cable link using an ethernet board in each terminal. Two ethernet boards are desirable in the reporter terminal so that isolation can be maintained between the opposing sides. A software package "Berkeley Sockets", developed at the University of California, Berkeley, is the preferred software base for maintaining the communication flow along the link. Packages implementing "Berkeley Sockets" are available through various third party vendors, including for example FTP Systems, Inc., Purlington, Mass. The communication links 20 and 22 are interconnected and function in a similar manner via the second ethernet board in the reporter terminal. Other hard-wired or wireless communication may also be implemented.

Two issues of isolation must be addressed by the communication links in the present invention. First, the court reporter stores all of the keystrokes pressed and all of the transcribed alphabetic and numeric text in the CAT system 13. These files must not be modifiable by any terminal on any down-line communication link. Such modifications would corrupt these files and the transcript would not be certifiable. Therefore, the communication out of CAT system 13 should only be that necessary to transmit copies of the stored files. More importantly, communication into CAT system 13 should only be that necessary to request transmission. Although additional communication features into and out of CAT system 13 may be added, they are not preferred.

Second, isolation must be established between the defending and examining terminals. Under no circumstances can the messages between the examining terminals be intercepted by the defending terminals. This requires that the communication links must be isolated. Isolation may be accomplished by using an independent hard-wired communication link as is illustrated in FIG. 1 via a serial or coaxial link, for example. Encryption of the communication exchanged may be used as a safeguard. However, if a wireless link is used, encryption becomes a requirement. Although various encryption schemes are contemplated, a preferred scheme involves the use of direct-sequence spread spectrum transmission. Such transceivers are relatively inexpensive and, by their very nature, provide encryption. Other exemplary communication links which might be implemented include token ring, parallel, infrared, RF (radio frequency), etc.

Figure 9:
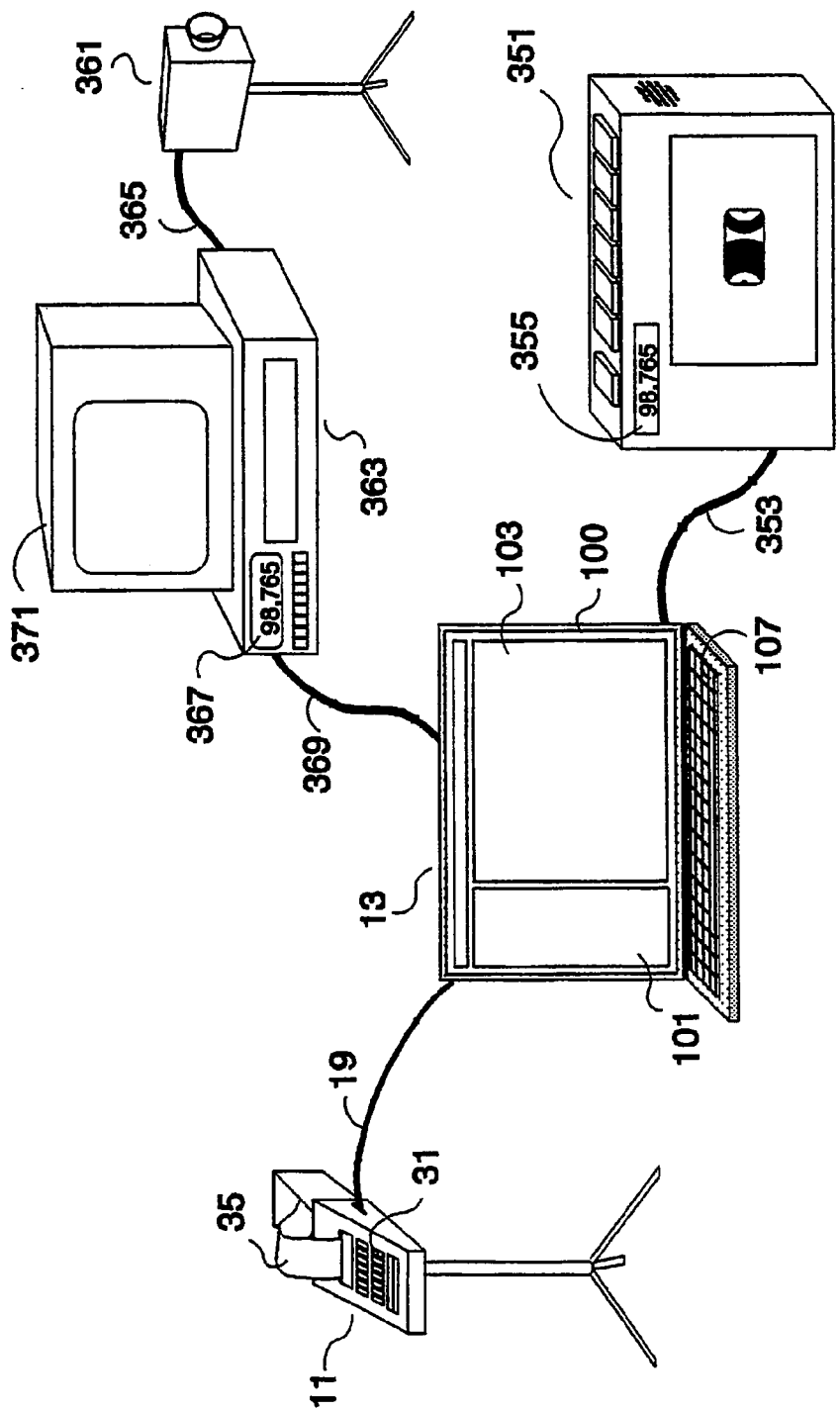
FIG. 9 is a perspective view illustrating the use of audio or video tracking in the present invention.

FIG. 9 illustrates additional features of the present invention which the court reporter and attorneys may utilize. As stated previously, the court reporter usually tapes the entire deposition or trial as a back up to the stenographic recording, and uses the audio tape to help in translating the proceedings. To avoid clumsy and time consuming searching through the audio tape to locate Q & A's, a synchronization scheme has been added to electronically associate each stenographically recorded Q & A with the actual position on the audio tape of the audio of the Q & A. With synchronization, the court reporter can quickly and easily locate audio on the tape.

Specifically, a tape recorder 351 is attached via a communication link 353 to the reporter terminal 13. Upon receiving an entire Q & A, the reporter terminal 13 requests and receives a position indication from the tape recorder 351. The marker position is generated by the tape recorder by a tape length counter 355 and associated circuitry. The reporter terminal 13 stores and associates each such position indication with the corresponding keystrokes. Thereafter, when necessary, the court reporter can display the position indicator and quickly locate the desired audio manually. Alternatively, communication link 353 can be used by reporter terminal 13 to communicate control signals to the tape recorder 351 so as to automatically position and play-back previously recorded audio upon request.

Instead of receiving position indications from the tape recorder 351, the reporter terminal 13 may send an audio signal representing an upcoming Q & A number to recorder 351 for recording. This audio signal may be either a voice-synthesized indication of the number count, aiding a manual search, or a digital data stream that is detectable by the recorder 351 using low or high speed searching directed via terminal 13.

Similarly, a video camera 361 may also be used to video tape of proceedings. Although video camera 361 may be able to independently store and play audio tapes, a separate video recorder, video recorder 363, is illustrated as being connected via a communication link 365 for this purpose. As with the audio recorder, video recorder 367 can be used in a synchronization scheme for associating and accessing video events with the transcribed text through communication link 369. A television monitor 371 provides for playing back recorded video information.

If the video or audio system is fully automated through the control of reporter terminal 13, upon a request from a judge or attorney to read back a Q & A, the court reporter may play back the associated audio and video by merely locating the requested Q & A on reporter terminal 13, possibly through a lexical search, and selecting a play-back command.

Also contemplated is the use object-oriented association of recordings using video frame grabbers and sound grabbers resident in reporter terminal 13 which digitally sample, store, associate and synchronize the video and audio of a proceeding. Synchronization would take place using a direct association of the transcribed text in a common programming object with the audio and video frames.

Using position synchronization for locating and playing audio and video also proves to be a valuable tool for the attorney. If the attorney desires to play portions of the audio or the video, for example, during trial, the attorney may use the lexical searching capabilities of the attorney terminals to locate the desired Q & A's, and may then automatically play the associated audio or video back for the judge and jury.

Figure 10:
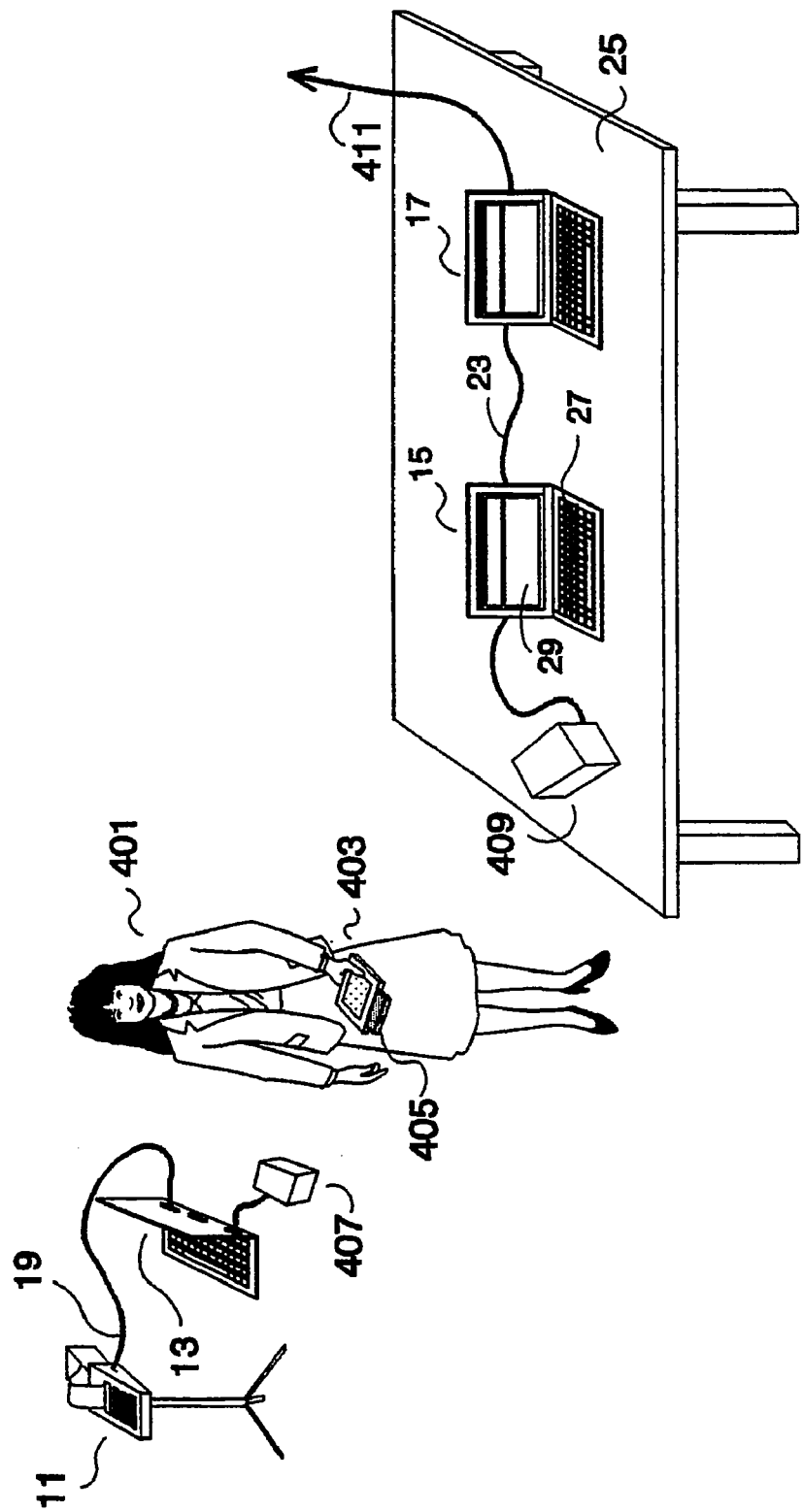
FIG. 10 is a perspective view of the wireless and hardwired interconnection of an alternate embodiment of the transcription system in a court room setting.

Referring to FIG. 10, a court room scenario is shown using the present invention. A first chair, examining attorney 401 holds a portable computer tablet 403 which has a wireless transceiver 405 attached thereto. The tablet 403 may provide pen-based or touch sensitive input and acts as a direct substitute to the attorney's paper note pad. In one embodiment, the wireless communication link is established using RF (radio frequency), spread-spectrum transmissions for the inherent data encryption associated therewith. As stated previously, other types of RF, ultrasonic or infrared transmission and data encryption schemes might also be used.

To guarantee isolation of the court reporter's transcription files, the terminal 13 only manages outgoing communication and requests therefore as described previously in relation to the configuration of FIG. 1. As explained above, although such communication exchanges involving the reporter terminal 13 do not require encryption, secure communications between the attorney terminals must exist to prevent interception by the opposing side (not shown). As illustrated, secure communication is accomplished between the terminals 15 and 17 using the independent hard-wired communication link 23. Encryption using a pseudo-random, secret spreading code common only to transceivers 405 and 409 implementing direct-sequence spread spectrum transmission secures the communication link between the attorney terminal 403 and either of the terminals 15 and 17. Other encryption schemes may also be used.

Wireless transmission may also be used by additional wireless transceivers (not shown) for use by additional on-site attorneys staffing the lawsuit. A communication line 411 may be used to establish a communication link with additional terminals used by attorneys, client's, or experts who are not in the court room, i.e. are remotely located off-site. Although the communication line 411 is a telephone line attaching to an internal modem of terminal 17, other communication methods such as a cellular RF link might be used. The communication line 411 provides for the active participation of off-site persons who might otherwise be unable, because of cost or time, to attend.

The local attorney terminals 403, 15, and 17 can control the flow of data through communication line 411. For example, if confidential information is being described, the attorney terminal 15 can block transmission off-site to a client by disabling outgoing communication via the off-site link via a command on the control line 259.

Together, the transceivers 407, 405, and 409 and the links 23 and 411 form a single communication link between the terminals. Channel isolation exists between the examining attorneys. File isolation exists at the CAT terminal 13. The characteristics of this single, overall communication link is transparent to the attorneys operating the terminals, they need only choose a destination and can send messages. Although not shown, the opposing attorneys also possess a similar communication system on a second, single communication link.

More specifically, the first chair, attorney 401, uses portable tablet 403 to record notes, receive translated Q & A's and exchange messages with the second chair at terminal 15. The first chair can either direct the message to one of the supporting attorneys at a terminal or globally send messages to all available attorneys at all of the terminals on the link. Similarly, messages can be received from such terminals. Although not necessary, a communication pathway hierarchy is preferred wherein all messages directed between the first chair and lower numbered chairs are intercepted by the second chair terminal for screening and redirection. In this way, the second chair attorney prevents the first chair attorney from being distracted by unnecessary, unimportant, or misdirected messages. Additional levels of hierarchy between the second and lower numbered chairs may also be implemented.

A terminal such as portable tablet 403 or attorney terminal 15 might also be used by the judge during and after trial for reviewing and analyzing the lawsuit. When facing a ruling on the matter, the judge might also use the features described above to determine whether proper evidentiary form was achieved in the Q & A. Similarly, for review and analysis, the jury might be provided such terminates during trial or deliberation to help reach their decisions. Especially beneficial in either situation would be the ability for audio and/or video review as described in relation to FIG. 9 above.

Figure 11:
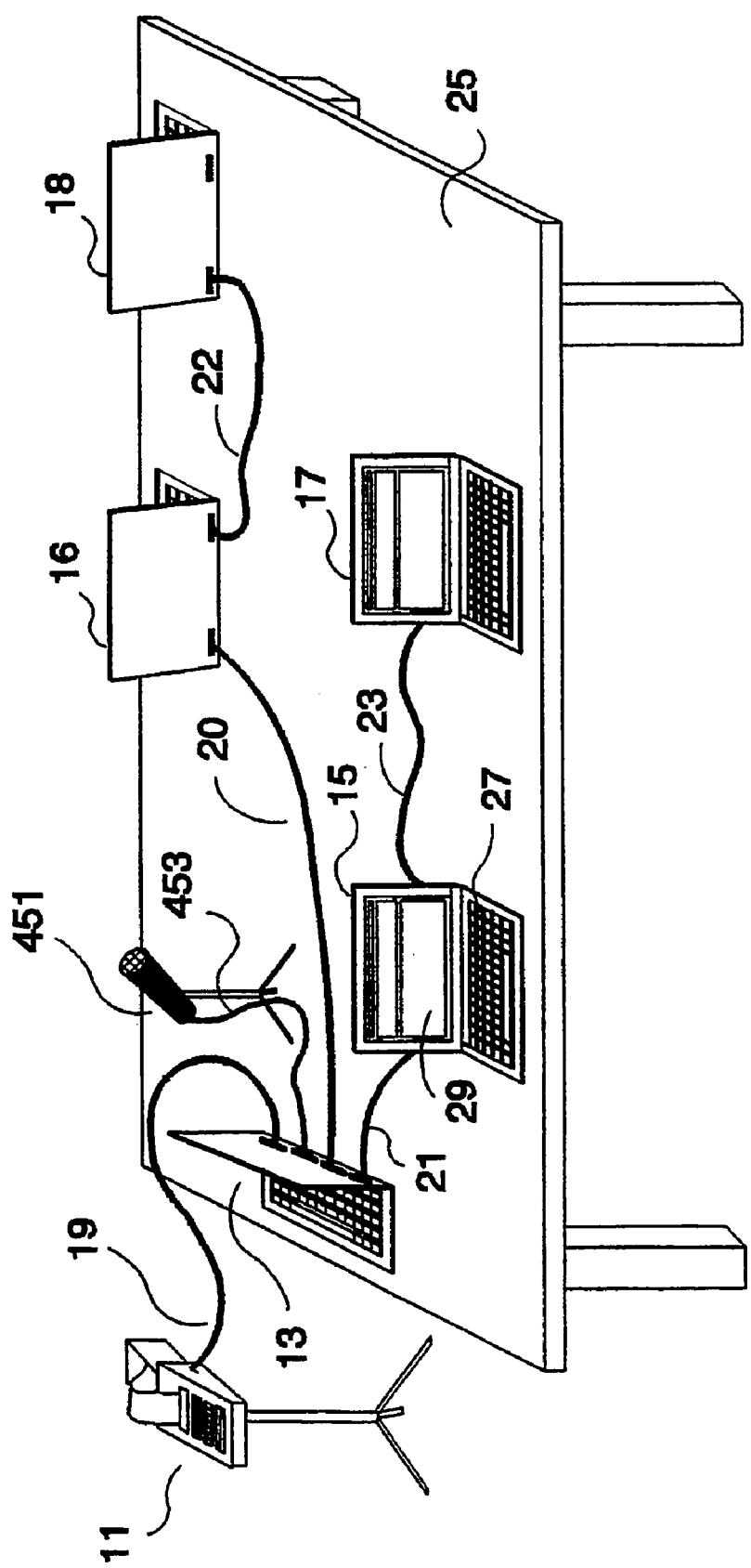
FIG. 11 is a perspective view of another embodiment of the present invention which cooperatively utilizes stenographic and voice transcription.

FIG. 11 illustrates an alternate embodiment wherein, instead of responding indirectly to stenographic keystroke translation, the reporter terminal 13 directly performs voice transcription and association. Added to the reporter terminal 13, a microphone 451 generates an analog voice signal representative of the words spoken during a proceeding. The analog voice signal passes along a communication link 453 to an A/D (analog to digital) converter board housed within reporter terminal 13. This A/D converter samples and digitally converts the analog voice signal to a series of digital values representative of the words spoken at the proceeding. Linear predictive coding ("LPC") techniques are then used either remotely (through an off-site computer link) or locally (within reporter terminal 13) to transcribe the deposition.

Additionally, the reporter terminal 13 may also use the stenographic keystroke input as a basis for training the voice transcription system. Specifically, the reporter terminal 13 breaks the digital voice signal into segments, and, using LPC techniques, synchronizes through association groups of the segments with corresponding keystrokes from the stenographic recorder 11. The process of associating the segmented digital voice signal with the corresponding stenographic keystrokes provides a method for training the voice transcription of the reporter terminal 13. Once trained, voice transcription may more effectively supersede the stenographic recorder 11 in generating a written transcript of the proceeding.

Figure 12:
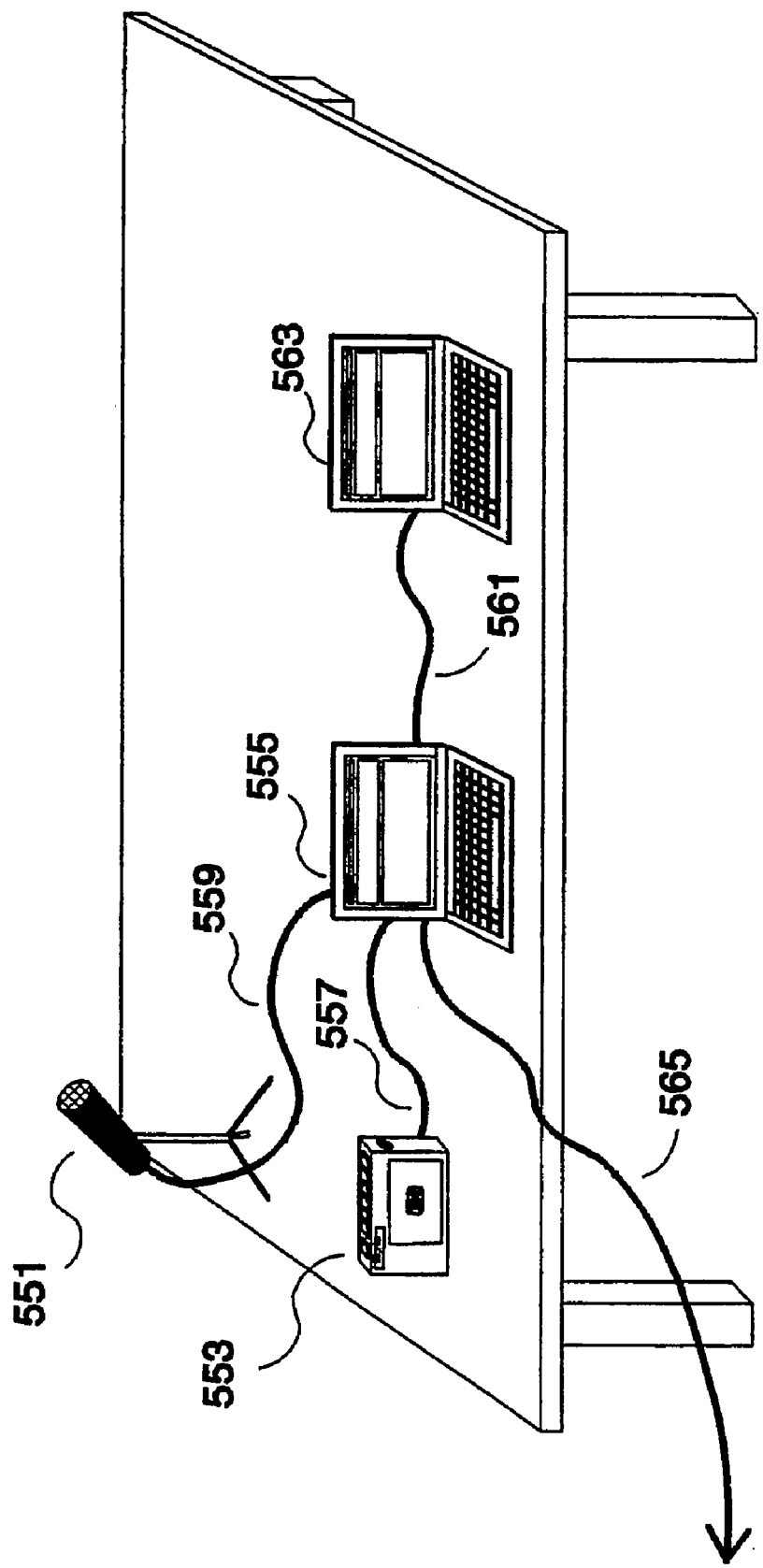
FIG. 12 is a diagram illustrating two alternate variations of the present invention where the court reporter terminal is not linked to the transcription network.

FIG. 12 is used to illustrate two alternate embodiments where the court reporter is not linked to the transcription network. In a first embodiment, voice transcription is directly managed by an attorney terminal 555 using a microphone 551 via a line 559. Voice transcription can occur either locally, within terminal 555, or remotely via a communication link 565. Additionally, as described previously, transcription, association, synchronization, and message exchanges would occur between terminal 555 and an associates terminal 563.

A second embodiment is illustrated wherein terminals 555 and 563 provide for message exchange and message association with the corresponding recorded audio on the tape, transcription not being available. Message association would occur using by either retrieving and storing the position indication from recorder 553, or sending for recording, audio or digital signals for manual of automated play back. A more detailed description of the functionality of such message association and play-back can be found above.

Figure 13:
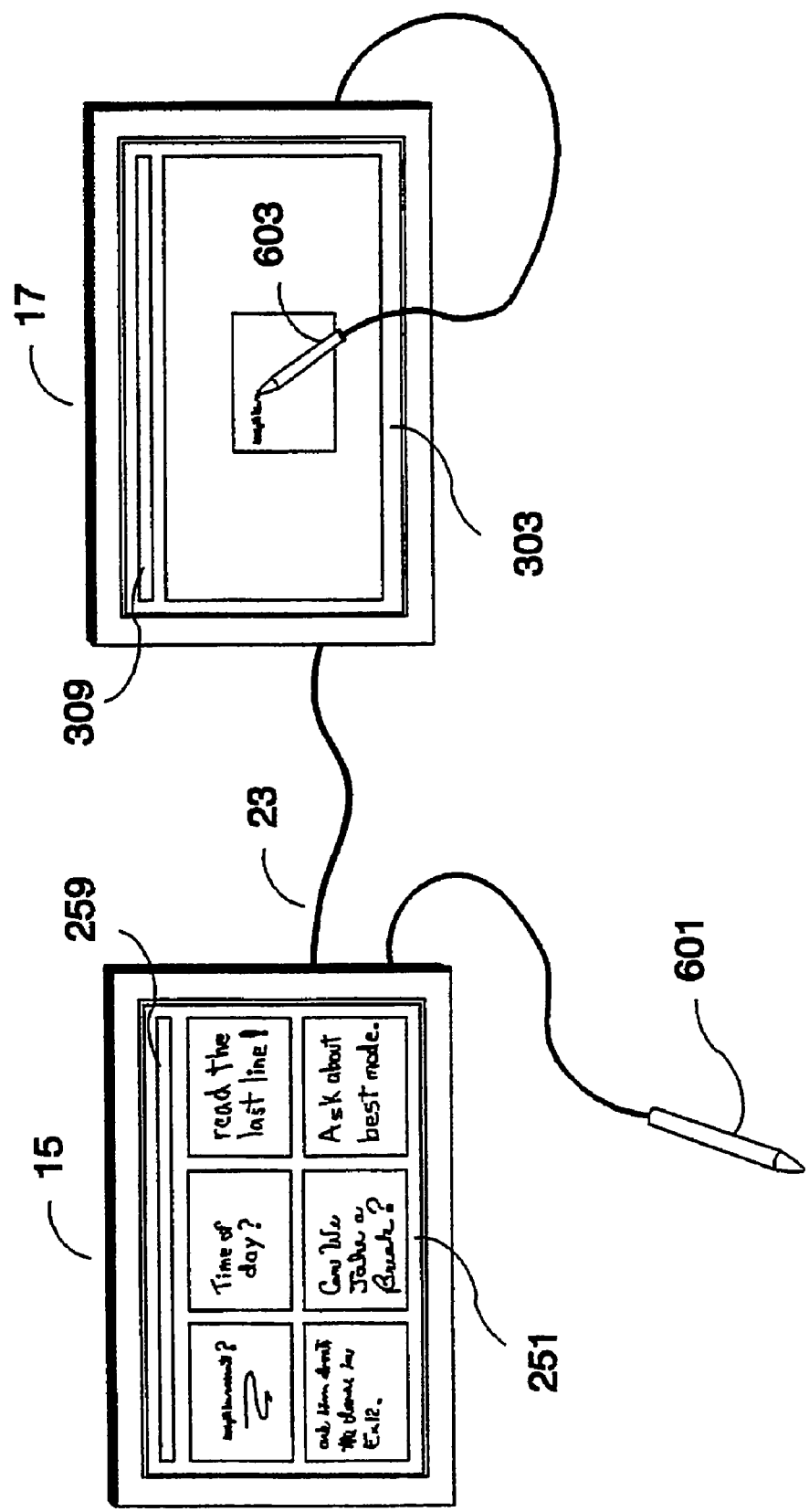
FIG. 13 is a perspective view of another embodiment of the present invention where, instead of using a keyboard, the attorney terminals 15 and 17 utilize pen-based or touch-sensitive screen input.

FIG. 13 is a perspective view of another embodiment of the present invention. Instead of using a keyboard, the attorney terminals 15 and 17 might adopt pen-based or touch-sensitive screen input. Pens 601 and 603 and the screens 251 and 303 provide an attorney a substitute for a pad and Post-it® brand notes. The associate attorney may open a computerized representation of the Post-it® brand note (a "computer note"), scribble a message thereon using the pen 603, and press the send command on the command line 309. Unlike actual Post-it® brand notes, computer notes can be expanded. Each expanded computer note is displayed in the default size yet has an associated scroll-bar and expand and reduce buttons that can be manipulated so that an oversized message can be fully read.

The terminal 17 directly sends the entire bit-mapped image of the computer note to the attorney terminal 15 for display in a tiled format (cascading may also be selected as a default) on the screen 251. The attorney operating the terminal 15 may then modify, delete, move, etc., the received computer note using the pen 601 and the commands from the command line 259. Message exchanges in the opposite direction and note taking, as previously described, works in a similar manner. Moreover, instead of sending a bit-map of the computer note, handwriting recognition software may be used to convert the note to a text format to make the notes more legible to the recipient. The recognition software may be selected directly through command line 259 or through a set-up default.

The transcription network of FIG. 13 is illustrated to operate without transcription input; however, if present, transcribed text can also be displayed by opening transcription windows as described above.

As with the previous embodiments, the associates terminal 17 has the ability to display and manipulate the messages displayed on the attorney terminal 15. For example, the associate can: 1) delete computer notes that have been used or become stale; 2) replace incomplete or unrecognizable notes; 3) rearrange the tiled or cascaded notes to better communicate priority or to organize subject matter; or 4) modify the significance indicator causing message border colors to change or flash (described more fully above) on the attorney terminal 15 indicating message priority.

Figure 14:
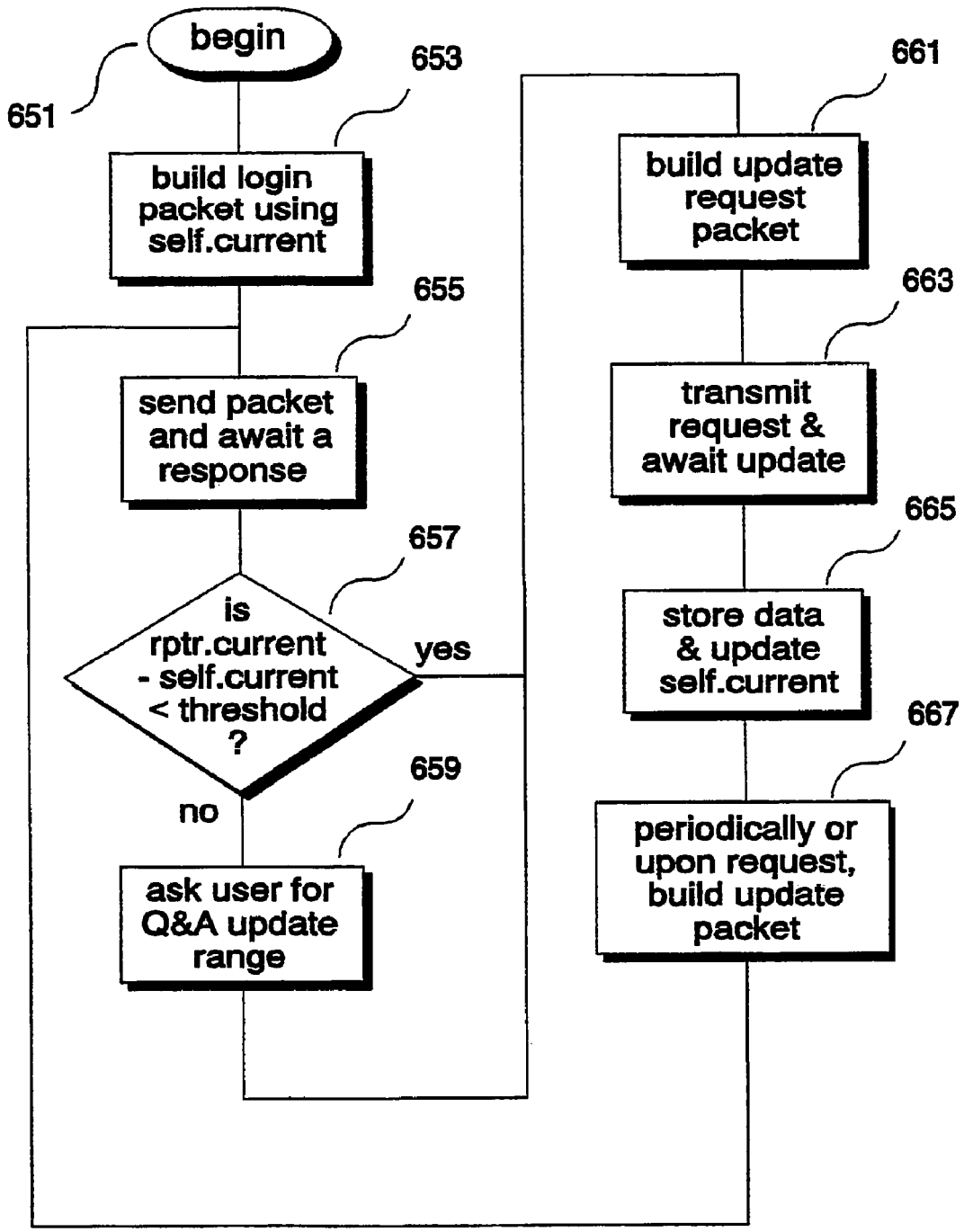
FIG. 14 illustrates a flow-chart describing the communication protocol used by the attorney terminals for communicating with the reporter terminal (or CAT system) 21.

FIG. 14 illustrates a flow-chart describing the communication protocol used by the attorney terminals for communicating with the reporter terminal (or CAT system) 21. Ordinarily, at the completion of a transcription of a full Q&A, the reporter terminal 13 transmits the Q&A down-line to along communication links 21 and 20, for example. If the attorney terminals, such as the terminals 15, 17, 16 and 18, are listening, they receive and update their screen displays appropriately. A specific protocol has be implemented to accommodate: 1) requests by the attorney, A specific pro preliminary translations; 2) attorney terminals which have not "heard" all of the Q&A transmissions; and 3) screening of Q&A's by a senior chaired attorney to those down-line such as remote, client terminals.

Specifically, as represented by a begin block 651, upon connecting to the communication link with the reporter terminal, the attorney terminals initiate the communication protocol. At a block 653, the attorney terminals construct a log-in packet, a packet of bytes of digital information, which consists of: 1) a source identifier, identifying itself as the source of the communication; 2) a destination identifier, identifying the reporter terminal as the destination; and 3) a pointer indicating the attorney terminal's current position, i.e., the pointer identifies the last Q&A that the attorney terminal has received from the reporter terminal.

The pointer to the last or most recent Q&A is referred to hereafter as a "self.current" pointer. If an attorney terminal is logging in for the first time in a deposition, the value of the "self.current" pointer is equal to zero (0) to indicate that no Q&A's have yet been received. Likewise, if the attorney terminal is logging in a second or subsequent time (because of either an accidental or purposeful disconnection), the "self.current" pointer is set to the last Q&A number received prior to the disconnection.

As represented by a block 655, the attorney terminal sends the log-in packet to the reporter terminal, and waits for a response. Upon receiving the log-in packet, the reporter terminal enters the source identifier into a log-in list, stores the "self.current" pointer, and transmits a responding packet containing a source identifier, destination identifier, and the number of the most recently translated Q&A. The most recent Q&A number is maintained by the reporter terminal's "rptr.current" pointer.

Upon receipt of the response packet, as illustrated by a block 657, the attorney terminal first determines the number of outstanding packets needed. This is done by subtracting the attorney terminal's "self.current" pointer value from the received, reporter terminal's "rptr.current" pointer value. The resulting difference (the number of needed Q&A's) is then compared to a threshold value. If the difference is less than the threshold value (a "yes" to the decision at block 657), the attorney terminal builds an update request packet, containing source, destination end update indicators, and transmits the packet as represented by blocks 661 and 663, respectively. In this instance, the update request packet is very similar to the log-in packet, containing: 1) a source identifier; 2) destination identifier; and 3) pointer to the attorney terminal's current position.

If the difference is greater than the threshold value (a "no" at block 657), the attorney terminal prompts the attorney using the attorney terminal for the range of Q&A's that are actually necessary, as represented by a block 659. The range is selected by choosing the earliest Q&A desired. The range would then be from the earliest Q&A to the most current Q&A as determined by the reporter terminal. The prompting for a range enables the attorney to evaluate the number of outstanding Q&A's that have not been received, and request only those that are truly needed. The thresholding prevents large deposition file downloading to late-coming attorneys where unnecessary. Thereafter, at the block 661, the attorney terminal constructs an update request packet using the selected range, and transmits it to the reporter terminal at the block 663. In this instance, the update request packet contains: 1) a source identifier; 2) destination identifier; and 3) the number of the earliest Q&A desired.

At block 663, after transmitting the update request, the attorney terminal awaits an update. The reporter terminal responds by sending the requested range. However, if the requesting attorney terminal or a higher chaired attorney has placed a Q, A or Q&A restriction upon the requesting terminal for all or part of the requested range of Q&A's, the reporter terminal transmits substituted text, such as "Restricted Viewing!" instead of the actual text translation where necessary. The reporter terminal tracks restrictions in the log-in table. Similarly, whenever a Q&A translation is complete, the reporter terminal only transmits the text of the translation to those attorney terminals having no restrictions placed thereon. To those attorney terminals with restrictions placed thereon, the substitute text is transmitted.

Upon receiving the requested Q&A's or substitute text therefor, as represented by a block 665, the attorney terminal stores the requested Q&A's and updates its "self.current" pointer. At this point, the attorney terminal is considered up to date. Thereafter, both periodically and upon an attorney's direct request (in response to specific keyboard or mouse input), the attorney terminal constructs an update packet, at a block 667, and repeats the cycle beginning with block 655. This looping cycle ensures that the attorney terminal stays up to date, even if the attorney terminal for any reason temporarily stops monitoring the communication link during the deposition.

Whenever a request packet is received which contains a "self.current" pointer which is equal to the reporter terminal's "rptr.current" pointer, the current Q&A pointed to by the "rptr.current" pointer is resent along with any partial translation for the next Q&A that has been completed. The current Q&A is always resent to make sure that the attorney terminal possesses the full translation thereof (in case only a partial translation is currently stored). The transmission of the partial translation of the subsequent Q&A allows the specifically requesting attorney to display the ongoing translation.

The value of the threshold depends on nature of the communication network and user preference. If the network is sluggish, the threshold should be set lower to off-load competing communication on the channel. To accommodate each user's preference, control of the threshold value is be placed at each attorney terminal.

Figure 15:
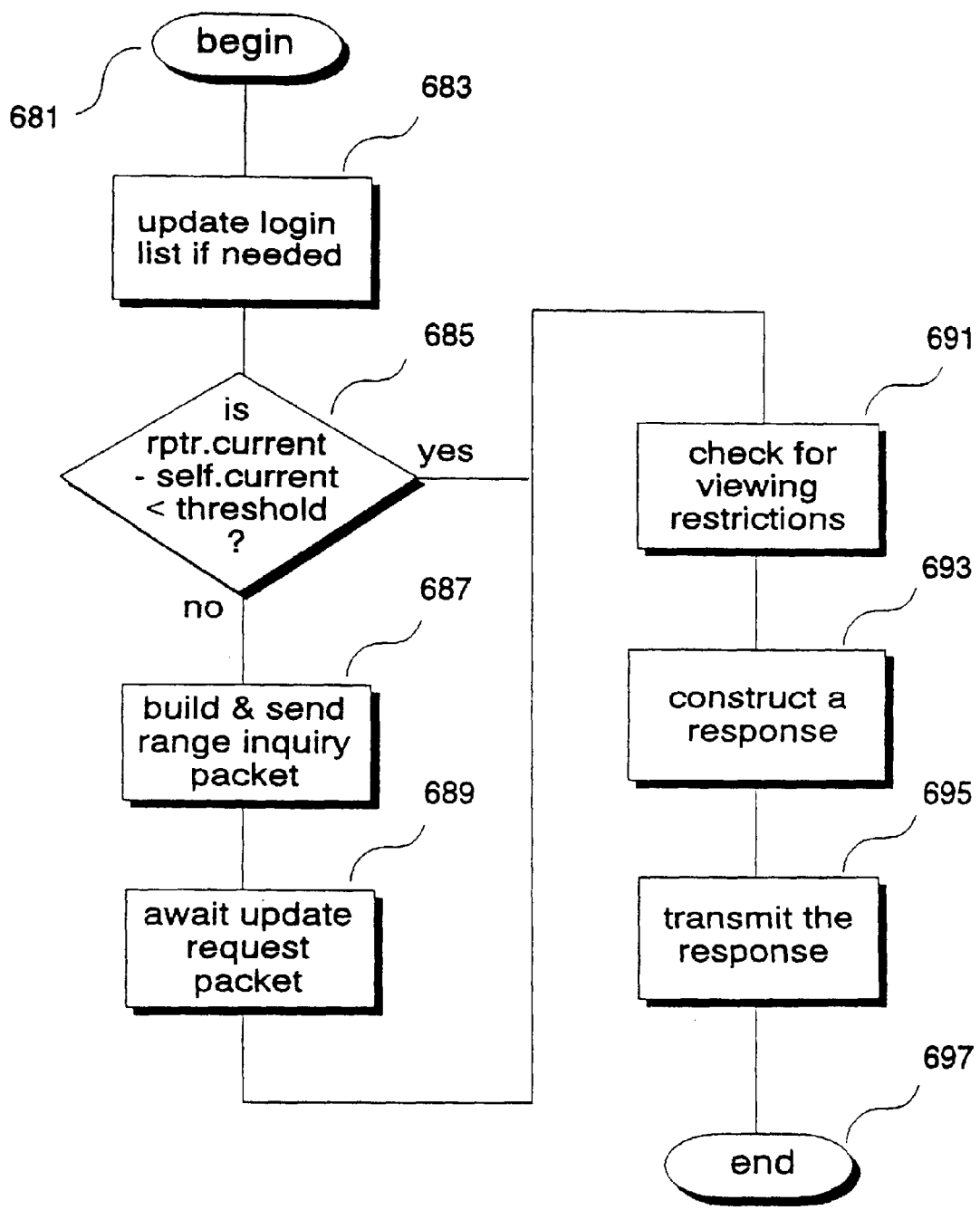
FIG. 15 illustrates an alternate flow-chart describing the reporter terminal's functionality in carrying out the Q&A communication protocol.

In addition, although the thresholding decision is made by the attorney terminal as represented by the block 657, in an alternate embodiment, the reporter terminal makes the decision. Specifically, referring to FIG. 15, a flow-chart of an alternate embodiment of the software protocol used by the reporter terminal 13 is shown. Upon receipt of either a log-in or update request packet, the reporter terminal initiates its response as represented by a begin block 681. At a block 683, the source indicator is compared to the log-in list to determine whether the currently requesting attorney terminal has been logged therein. If not, the source indicator (or source identifier) is added to the log-in list.

At a decision block 685, the reporter terminal compares the received "self.current" pointer with its "rptr.current" pointer. If the difference between the two is less than a threshold value (as indicated by the "yes" path), the reporter terminal: 1) checks for viewing restrictions in the requested range, at a block 691; 2) constructs a response which includes all of the requested Q&A's with substituted text where restricted, at a block 693; 3) transmits the response to the requesting attorney terminal, at the block 695; and 4) exits the routine at the end block 697. However, if the difference at the decision block 685 is greater than the threshold value (indicated by the "no" pathway), prior to encountering blocks 691, 693, 695 and 697, the reporter terminal first prepares and sends a range packet inquiry to the requesting terminal and awaits an update response therefrom, respectively at blocks 687 and 689. The range inquiry packet indicates the total range of outstanding Q&A's. The attorney terminal responds by prompting the user for the earliest desired Q&A, constructs another update request packet, and transmits it to the reporter terminal which awaits its receipt at the block 689. From this responsive update request packet, the reporter terminal completes the protocol through the remaining blocks as described above.

Additionally, it is obvious that the embodiments of the present invention described hereinabove are merely illustrative and that other modifications and adaptations may be made without departing from the scope of the appended claims.

We claim:

1. A transcription system, comprising:
 a transcription module configured to generate one or more transcription signals that include transcribed text representing one or more spoken words in real time, wherein the transcription module synchronizes the transcribed text in the one or more transcription signals with one or more recordings that correspond to the transcribed text;

a first communication device communicatively coupled to the transcription module over one or more communication links, wherein the first communication device is configured to:
- display the transcribed text in the one or more transcription signals in response to receiving the one or more transcription signals from the transcription module over the one or more communication links;
- define a message that annotates a selected portion of the transcribed text displayed on the first communication device; and
- transmit the message that annotates the selected portion of the transcribed text displayed on the first communication device over the one or more communication links; and a second communication device communicatively coupled to the transcription module and the first communication device over the one or more communication links, wherein the second communication device is configured to:
- receive the message transmitted from the first communication device over the one or more communication links;
- display the selected portion of the transcribed text annotated with the message transmitted from the first communication device, wherein the second communication device displays the selected portion of the transcribed text with the message annotating the selected portion of the transcribed text in response to receiving a selection of the message on the second communication device; and
- play a portion of the one or more recordings synchronized with the selected portion of the transcribed text in the one or more transcription signals.

2. The transcription system of claim 1, wherein the message that the first communication device defines to annotate the selected portion of the transcribed text includes one or more pretyped messages selected on the first communication device from a set of pretyped messages accessed on the first communication device.

3. The transcription system of claim 1, wherein the second communication device displays the message transmitted from the first communication device in a communications stack in response to receiving the message from the first communication device, wherein the communications stack includes the message and one or more additional messages displayed in an order based on a priority level that the first communication device defines for the message.

4. The transcription system of claim 1, wherein the second communication device is further configured to:
- automatically perform a real time evaluation of the one or more transcription signals generated by the transcription module; and
- selectively indicate an existence of a potential legal objection to the one or more spoken words represented in the transcribed text in response to the real time evaluation of the one or more transcription signals.

5. The transcription system of claim 1, wherein one or more of the first communication device or the second communication device are further configured to
- prevent a remote communication device further communicatively coupled to the one or more communication links from receiving the one or more transcription signals in response to the first communication device or the second communication device placing a confidential restriction on the transcribed text in the one or more transcription signals.

6. The transcription system of claim 1, further comprising a third communication device configured to:
- intercept the message that the first communication device transmits to the second communication device over the one or more communication links, wherein the one or more communication links provide a hierarchical communication pathway that enables the third communication device to intercept the message transmitted from the first communication device prior to the second communication device receiving the message; and
- redirect the message intercepted from the first communication device to the second communication device over the one or more communication links, wherein the second communication device receives the message transmitted from the first communication device in response to the third communication device redirecting the intercepted message to the second communication device.

7. The transcription system of claim 1, wherein the first communication device controls, over the one or more communication links, the display of the message and the selected portion of the transcribed text annotated with the message on the second communication device.

8. The transcription system of claim 1, wherein the one or more communication links securely isolate the message transmitted from the first communication device to the second communication device from one or more additional communication devices further communicatively coupled to the one or more communication links.

9. The transcription system of claim 2,
wherein the one or more pretyped messages selected on the first communication device to annotate the selected portion of the transcribed text represents an observed demeanor of a witness associated with the one or more spoken words.

10. The transcription system of claim 1, wherein the first communication device and the second communication device are further configured to store the message and the selected portion of the transcribed text annotated with the message to enable subsequent review of the message and the selected portion of the transcribed text annotated with the message.

11. The transcription system of claim 1, wherein to synchronize the transcribed text in the one or more transcription signals with the one or more recordings that correspond to the transcribed text, the transcription module is further configured to:
- associates the transcribed text in the one or more transcription signals with a position indicator generated from the one or more recordings corresponding to the transcribed text;
- communicate a signal associated with the one or more spoken words to a recorder that captures the one or more recordings corresponding to the transcribed text; and
- associate a common object-oriented programming object with the transcribed text in the one or more transcription signals and the one or more recordings corresponding to the transcribed text.

12. The transcription system of claim 8, further comprising a reporter terminal that includes the transcription module, a first Ethernet board for the first communication device and the second communication device, and a second Ethernet board for the one or more additional communication devices, wherein the reporter terminal uses the first Ethernet board to communicate the one or more transcription signals to the first communication device and the second communication device in isolation from the one or more additional communication devices.

13. The transcription system of claim 8, wherein the one or more communication links encrypt the message transmitted from the first communication device with one or more secrets shared between the first communication device and the second communication device in response to the first communication device wirelessly transmitting the message over the one or more communication links, thereby securely isolating the message from the one or more additional communication devices.

14. The transcription system of claim 8, wherein the one or more communication links include an independent hard-wired link between the first communication device and the second communication device, whereby the first communication device transmitting the message to the second communication device over the independent hard-wired link securely isolates the message from the one or more additional communication devices.

15. A transcription method, comprising:
generating, with a transcription module, one or more transcription signals that include transcribed text representing one or more spoken words in real time;
synchronizing the transcribed text in the one or more transcription signals with one or more recordings that correspond to the transcribed text;
displaying the transcribed text in the one or more transcription signals on a first communication device communicatively coupled to the transcription module over one or more communication links, wherein the first communication device defines a message that annotates a selected portion of the transcribed text;
transmitting the message that annotates the selected portion of the transcribed text from the first communication device to a second communication device over the one or more communication links, wherein the second communication device displays the selected portion of the transcribed text with the message annotating the selected portion of the transcribed text in response to receiving a selection of the message on the second communication device; and
playing a portion of the one or more recordings synchronized with the selected portion of the transcribed text in the one or more transcription signals.

16. The transcription method of claim 15, wherein the message that the first communication device defines to annotate the selected portion of the transcribed text includes one or more pretyped messages selected on the first communication device from a set of pretyped messages accessed on the first communication device, and wherein the one or more pretyped messages selected on the first communication device to annotate the selected portion of the transcribed text represents an observed demeanor of a witness associated with the one or more spoken words.

17. The transcription method of claim 15, further comprising displaying the message transmitted from the first communication device in a communications stack on the second communication device, wherein the communications stack includes the message and one or more additional messages displayed in an order based on a priority level that the first communication device defines for the message.

18. The transcription method of claim 15, further comprising indicating a potential legal objection to the one or more spoken words represented in the transcribed text in response to the second communication device performing a real time evaluation of the one or more transcription signals.

19. The transcription method of claim 15, further comprising preventing a remote communication device further communicatively coupled to the one or more communication links from receiving the one or more transcription signals in response to the first communication device or the second communication device placing a confidential restriction on the transcribed text in the one or more transcription signals.

20. The transcription method of claim 15, further comprising:
intercepting the message that the first communication device transmits to the second communication device over the one or more communication links at a third communication device, wherein the one or more communication links provide a hierarchical communication pathway that enables the third communication device to intercept the message transmitted from the first communication device prior to the second communication device receiving the message; and
redirecting the message that the third communication device intercepted from the first communication device to the second communication device over the one or more communication links, wherein the second communication device receives the message transmitted from the first communication device in response to the third communication device redirecting the intercepted message to the second communication device.

21. The transcription method of claim 15, further comprising controlling the second communication device displaying the message and the selected portion of the transcribed text annotated with the message at the first communication device, wherein the first communication device deletes the message on the second communication device over the one or more communication links to control displaying the message and the selected portion of the transcribed text annotated with the message on the second communication device.

22. The transcription method of claim 15, further comprising securely isolating the message transmitted from the first communication device to the second communication device from one or more additional communication devices further communicatively coupled to the one or more communication links, wherein securely isolating the message from the one or more additional communication devices includes:
communicating the one or more transcription signals from a reporter terminal that includes the transcription module to the first communication device and the second communication device using a first Ethernet board for the first communication device and the second communication device, wherein the reporter terminal further includes a second Ethernet board for the one or more additional communication devices to communicate the one or more transcription signals using the first Ethernet board in isolation from the one or more additional communication devices;
encrypting the message transmitted from the first communication device with one or more secrets shared between the first communication device and the second communication device in response to the first communication device wirelessly transmitting the message over the one or more communication links, thereby securely isolating the message from the one or more additional communication devices; and
transmitting the message to the second communication device over an independent hard-wired link that the one or more communication links include to securely isolate the message from the one or more additional communication devices.

23. The transcription method of claim 15, further comprising storing the message and the selected portion of the transcribed text annotated with the message on the first communication device and the second communication device to enable subsequent review of the message and the selected portion of the transcribed text annotated with the message.

24. The transcription method of claim 15, wherein synchronizing the transcribed text in the one or more transcription signals with the one or more recordings corresponding to the transcribed text includes:
associating the transcribed text in the one or more transcription signals with a position indicator generated from the one or more recordings corresponding to the transcribed text;
communicating a signal associated with the one or more spoken words represented in the transcribed text to a recorder that captures the one or more recordings corresponding to the transcribed text; and
associating a common object-oriented programming object with the transcribed text in the one or more transcription signals and the one or more recordings corresponding to the transcribed text.

\* \* \* \* \*